(12) United States Patent
Yu et al.

(10) Patent No.: US 11,215,338 B2
(45) Date of Patent: Jan. 4, 2022

(54) BATWING DIFFUSING LENS LUMINAIRE

(71) Applicant: Vode Lighting LLC, Sonoma, CA (US)

(72) Inventors: Scott S Yu, SonomA, CA (US); Richard Wong, Sonoma, CA (US)

(73) Assignee: VODE LIGHTING, LLC, Sonoma, CA (US)

( * ) Notice: Subject to any disclaimer, the term of this patent is extended or adjusted under 35 U.S.C. 154(b) by 0 days.

(21) Appl. No.: 17/131,344

(22) Filed: Dec. 22, 2020

(65) Prior Publication Data

US 2021/0302007 A1 Sep. 30, 2021

Related U.S. Application Data

(63) Continuation-in-part of application No. 16/908,573, filed on Jun. 22, 2020, now Pat. No. 10,907,795, and a continuation-in-part of application No. 29/729,902, filed on Mar. 31, 2020.

(51) Int. Cl.
| | |
|---|---|
| *F21V 5/04* | (2006.01) |
| *F21V 3/00* | (2015.01) |
| *F21V 21/34* | (2006.01) |
| *G02B 17/08* | (2006.01) |

(52) U.S. Cl.
CPC ............... *F21V 5/045* (2013.01); *F21V 3/00* (2013.01); *F21V 21/34* (2013.01); *G02B 17/086* (2013.01)

(58) Field of Classification Search
CPC . F21V 5/045; F21V 21/34; F21V 3/00; G02B 17/086
See application file for complete search history.

(56) References Cited

U.S. PATENT DOCUMENTS

| | | | | |
|---|---|---|---|---|
| 1,977,689 | A * | 10/1934 | Muller | B61L 5/1845 340/815.76 |
| 8,469,552 | B2 * | 6/2013 | Moeller | F21V 7/0091 362/311.02 |
| 2003/0165065 | A1 * | 9/2003 | Roller | F21V 29/70 362/522 |
| 2014/0160766 | A1 * | 6/2014 | Chinniah | G02B 19/0028 362/308 |
| 2015/0085513 | A1 * | 3/2015 | Spinger | F21S 43/239 362/522 |
| 2017/0138564 | A1 * | 5/2017 | Lmosdi | G02B 19/0014 |

\* cited by examiner

*Primary Examiner* — Evan P Dzierzynski
(74) *Attorney, Agent, or Firm* — Michael Petrin; Antero, Tormey & Petrin

(57) ABSTRACT

A luminaire featuring a light diffusing housing assembly with a batwing style catadioptric lens element with properties capable of producing a more uniform field of illumination in concert with a secondary diffusing lens element and optional internal light reflecting elements to maximize light output from a point light source including an LED, or a plurality of individual point light sources including an LED strip or LED array and other source of linear chromatic light or linear illumination sources including a light bar, fluorescent lamp, compressed-gas discharge tube and the like.

21 Claims, 15 Drawing Sheets

BATWING DIFFUSING LENS LUMINAIRE

PRIORITY

This application claims the benefit of the priority of U.S. patent application Ser. No. 29/729,902, filed on Mar. 31, 2020, which is incorporated in its entirety by reference herein, and further claims the benefit of the priority of pending U.S. patent application Ser. No. 16/908,573, filed on Jun. 22, 2020, which is incorporated in its entirety by reference herein.

BACKGROUND

It is known to use light emitting sources, including for example, but not limited to, incandescent lamps, fluorescent tubes, and solid state light sources including, but not limited to light emitting diodes (LEDs), LED arrays, Lambertian emitters, $2\pi$ emitters, and fiber optic light guides, in a variety of applications, including, but not limited to, retail and commercial lighting applications where a uniform lighting field is desirable. Specifically, linear LED sources and LED arrays are increasingly finding applications in retail, commercial, and general lighting applications since their radiative light outputs have increased exponentially, prices have fallen significantly over the past few years and reliability of the materials have improved significantly, leading to lower installation and less frequent repair and replacement. LEDs are attractive due to their small size and the fact that they consume less power relative to incandescent and fluorescent light sources. The popularity of LEDs as light sources is expected to continue and increase as their potential benefits are further developed, particularly with respect to increased light output.

Available LEDs come in different sizes and different emitting cone angles. An emitting cone angle is typically referred to as $2\varphi$. LEDs emit light over a wide range of cone angles, ranging from 15 degrees (forward emitting or side emitting) to 180 degrees (hemispherical emitting). It is therefore very important to construct efficient light dispersal assemblies to harness the maximum possible light output from LEDs and direct it in a predetermined and controlled manner. Generally, these LED arrays are simply substituted into existing luminaires as an improved light source, but uniformity of the emitted light, even with a typical diffuser lens in place, is poorer due to the nature of the point source emissivity of the LEDS, even when combined and spaced at closer distances such as in a linear LED array designed to replace a fluorescent tube.

There is a need in the lighting systems field to create lighting systems and luminaires with improved and more uniform field illumination and which can be used with any type of light source or solid state light source such as an LED to direct light in a predetermined manner. According, there is also a need for improved lenses and light dispersion means that function better with point source emission devices, like LEDs and as well with linear LED arrays, that are able to better disperse incident light to create a brighter, more uniform and improved field of illumination.

Embodiments of this present invention provide such an improved LED dispersing lens system in the form of a luminaire featuring a housing configuration suitable for hosting a batwing-style catadioptric lens in combination with a light source, mounting means, supporting structure and augmented internally reflective light elements acting in concert with a light diffusing lens element to increase and optimize the overall luminosity and uniformity of illumination provided by the luminaire assemblies of the present invention.

SUMMARY

The present invention, as disclosed by the various inventive embodiments described hereinbelow, addresses these requirements by providing a luminaire housing assembly hosting a catadioptric lens assembly including an upper section and a lower section featuring a plurality of lens lobes, the upper and lower sections encompassing a central section and terminating with end sections. The central section is bilaterally symmetric and centered about an optical axis, being symmetric to a plane passing through said optical axis and extending along the length of the catadioptric lens assembly. The end sections terminate the left and right sides of the catadioptric lens assembly and serve to provide a means to secure the lens assembly within a luminaire without visually obstructing the lens lob portions. The center section features two upper lobes with positively curved surfaces (convex) having a circular, elliptical or parabolic shape, both bilaterally symmetric about the optical axis. The center section features a single lower lobe with a negatively curved surface (concave) having a circular shape, being bilaterally symmetric about the same optical axis. In related embodiments of the present invention, the bilaterally symmetry of the catadioptric lens enables an increased transmission of light when a light source is oriented to emit along the optical axis, and spaced at an optimum distance from the lens as enabled by the luminaire assemblies of this present disclosure.

Based on ray-tracing results, but without being bound by theory, it is believed that the combination in the present inventive catadioptric lens assembly of a single lower optical lobe and two upper optical lobes that have opposite surface curvatures and whose center of radii are offset from the optical axis and positioned proportionally along the vertices of an inverted triangle, creates a much higher degree of internal reflection and subsequently a greater amount of refracted light being transmitted in a manner parallel to the optical axis, and such refracted light emanating from the inventive lens assembly is more uniformly dispersed. Further, the inclusion of either a top or bottom layer of an optical material with differing optical properties tends to increase internal refraction, resulting in even improved uniformity of emitting light. When such a top or bottom layer, or combination of the two are further selected or treated to have additional light scattering or light dispersion properties, such as for example, but not limited to texturing, hazing, etching, frosting or adding an opacifier or light scattering material, the presence of an additional layer or surface treatment to the catadioptric lens further improves the light collection and ultimately improves the overall dispersion and uniformity of light produced by a luminaire employing the inventive catadioptric lens assembly as disclosed herein in further, more detailed embodiments. Without being bound by theory, the inclusion of one or more layers having light dispersion or light scattering properties aids in the degree of internal reflection as well as internal refraction of light rays resulting in a more uniformly distributed light emission through the inventive lens systems without significant loss due to internal reflections that would otherwise divert incident light to the edges or upper receiving surfaces of the lens assembly.

The combined use of the catadioptric lens with a second diffusing lens element provides an even greater degree of luminosity and uniformity in the field of illumination emitting from a luminaire assembly as disclosed herein employing these batwing-style catadioptric lenses.

Further, the combined use of internal light reflecting elements positioned on the inside surfaces of the luminaire housing assembly provides for increased light emission from the luminaire as well as improving the uniformity and angular extent of the illumination field.

Figure 1:
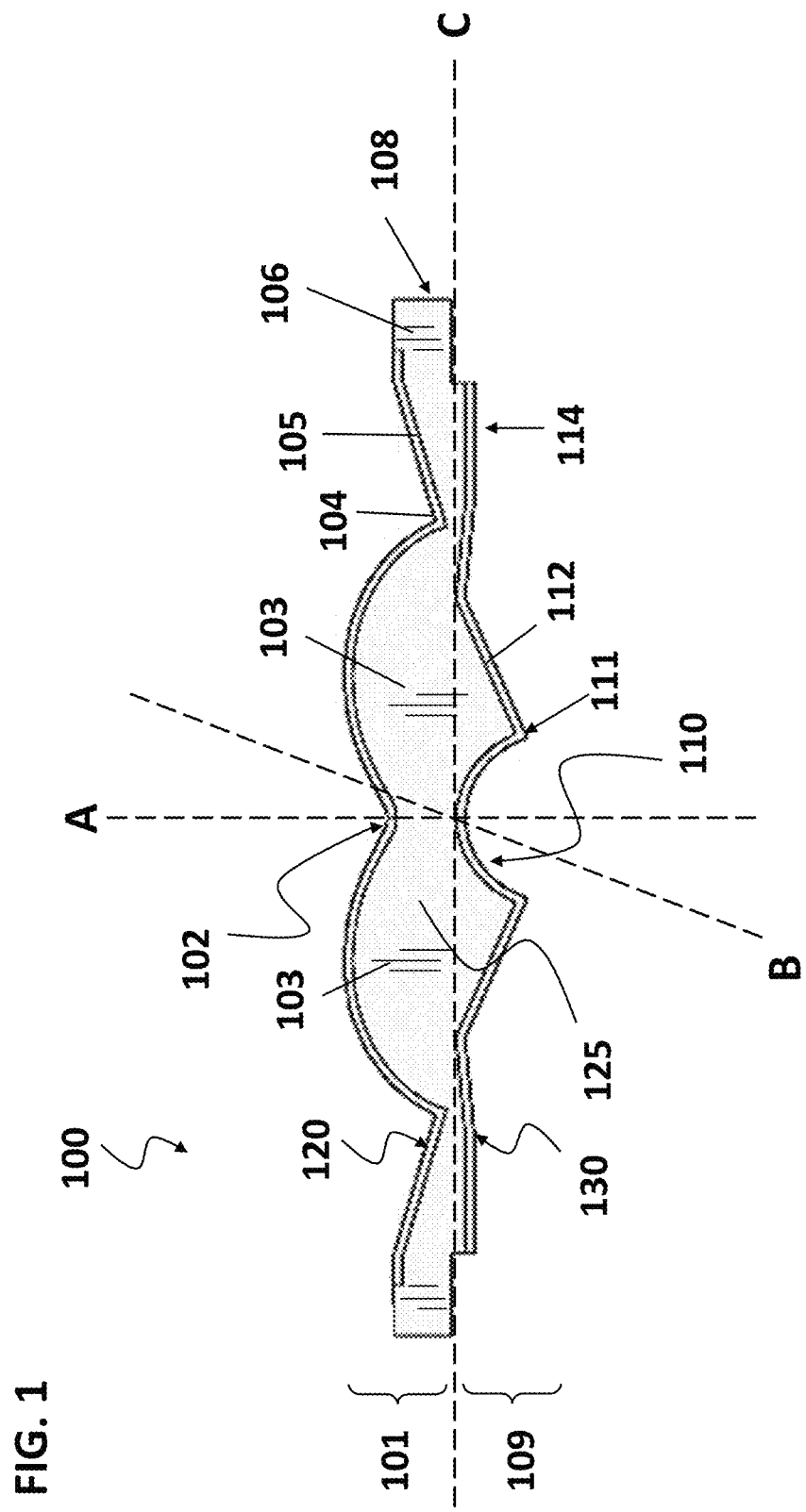
FIG. 1 shows an inventive embodiment of a cross-sectional representation of a coextruded catadioptric lens assembly or alternatively a lens assembly with upper and lower layers.

A corresponding Figure Key detailing the specific component parts, regions and configuration of embodiments of the inventive disclosure is attached to this Application in an Appendix, which is incorporated herein in its entirety.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Embodiments of the inventive disclosure presented herein include a catadioptric lens assembly for use with various light emitting sources. The lens assembly includes an upper section and a lower section that are both coplanar about a horizontal axis, and which are symmetrically centered about a vertical (normal) optical axis perpendicular to the longitudinal optical axis and a plane corresponding to these said two axes. The upper section includes two lobes whose surfaces feature a generally positively curved elliptical, circular or parabolic shape, being bilaterally symmetric about the vertical optical axis, and connecting to symmetric upper linear transition regions on both sides of the upper section further transitioning to corresponding edge support regions. The lower section of the inventive lens assembly features a single lobe whose surface features a generally negatively curved circular shape, the single lobe being bilaterally symmetric about the vertical optical axis, connecting to symmetric lower linear transition regions on both sides of the lower section transitioning to corresponding edge support regions, the upper and lower sections sharing said left and right edge support regions at the extreme left and right sides of the lens assembly. The top surface of the upper section of the lens assembly is the area of the lens assembly that is axially closest to the light emitting source. Co-extrusion of materials to form either a top, or bottom or dual coextruded layer integral to the surface of the catadioptric main lens enables uniform reflection and refraction of light incident to the top surface of the inventive lens assembly to be dispersed over a larger and more uniformly illuminated surface on the opposite or distal side (lower) of the inventive lens assembly. In various embodiments of the present invention as disclosed herein, the coextruded top and bottom layers may be of the same material, optical properties and optical density or alternatively the same material treated to have different optical properties, such as decreased translucency or transmission density to increase light scattering and dispersion properties, or may alternatively be of a different material, being compatible for co-extrusion and lamination onto the coextruded main lens region, but having different optical properties or densities. Examples include, but are not limited to, coextruded polymers having an added scattering material, or surface treatments to the coextruded polymer layers than provide translucency, such as frosting, etching, texturing, knurling and related surface modifications that provide for increased incident light dispersion.

Further inventive embodiments include a lens assembly with a single extruded main lens region which has optionally either a top, bottom or dual top and bottom layer of material intimately applied to the main lens region in a similar manner as illustrated for coextruded portions as disclosed herein, where the optional top and bottom layers are selected having differing optical properties than that of the main lens region.

One inventive embodiment of the present disclosure is a catadioptric lens assembly comprising (a) a lens configured to receive light from a light source; wherein said lens has an upper lens section and a lower lens section disposed opposite the upper lens section; wherein said upper and lower lens sections encompass a intermediate mains lens region; wherein the light from said light source is directed onto said upper lens section and is subsequently emitted from said lower lens section; wherein the upper lens section features a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; wherein said right and left lower transitions regions are contiguous and adjacent to said right and left edge support regions, respectively; and (b) a light source; wherein said light source is selected from a point source, a linear source, and a linear array of point sources.

Another inventive embodiment of the present disclosure is a catadioptric lens assembly wherein at least a portion of either said upper or lower surfaces of said upper and lower lens sections is composed of materials having different optical properties from said main lens region.

Yet another inventive embodiment of the present disclosure is a catadioptric lens assembly wherein said upper lens section comprises an upper coextruded top layer adjacent to and contiguous with said upper lens section and extending from a first left edge support region to a second right edge support region.

A further inventive embodiment of the present disclosure is a catadioptric lens assembly wherein said lower lens section comprises a lower coextruded bottom layer adjacent to and contiguous with said lower lens section and extending from a first left edge support region to a second right edge support region.

Yet a further inventive embodiment of the present disclosure is a catadioptric lens assembly wherein said upper lens section comprises an upper coextruded top layer adjacent to and contiguous with said upper lens section and extending from a first left edge support region to a second right edge support region; and wherein said lower lens section comprises a lower coextruded bottom layer adjacent to and contiguous with said lower lens section and extending from a first left edge support region to a second right edge support region.

Another inventive embodiment of the present disclosure is a catadioptric lens assembly wherein said portion of either of said upper or lower surfaces of said upper and lower lens sections comprises a contiguous film of uniform thickness of a material having different optical properties from said main lens region.

A further inventive embodiment of the present disclosure is a catadioptric lens assembly wherein said upper lens lobes have upper surfaces exhibiting a surface curvature corresponding to a segment selected from a circle, ellipse and parabola; and wherein said lower lens lobe has a lower surface exhibiting a surface curvature corresponding to a segment of a circle.

Yet a further inventive embodiment of the present disclosure is a catadioptric lens assembly wherein said upper lens lobes with upper surfaces exhibiting a convex surface curvature corresponding to a segment of a circle have centers of origin C2 and C3 located on a horizontal plane parallel to a plane bisecting said upper and lower lens sections, and have a radius of R2.

Another inventive embodiment of the present disclosure is a catadioptric lens assembly wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3.

Yet another inventive embodiment of the present disclosure is a catadioptric lens assembly wherein said upper lens lobes with upper surfaces exhibiting a convex surface curvature corresponding to a segment of a parabola have centers of origin C2 and C3 located on a horizontal plane parallel to a plane bisecting said upper and lower lens sections, and have a radius of R2 and a parabolic constant of n.

An additional inventive embodiment of the present disclosure is a catadioptric lens assembly wherein said lower lens lobe with a lower surface exhibiting a concave surface curvature corresponding to a segment of a circle has a center of origin C1 located on a normal perpendicular axis A, and having a radius of R1.

Another inventive embodiment of the present disclosure is a catadioptric lens assembly wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3; and wherein said lower lens lobe with a lower surface exhibiting a concave surface curvature corresponding to a segment of a circle has a center of origin C1 located on a perpendicular optical axis A, and having a radius of R1.

Yet another inventive embodiment of the present disclosure is a catadioptric lens assembly wherein said second and third centers of origin C2 and C3 are located on a horizontal plane bisecting said upper lens section and said lower lens section; with a first center of origin located on said perpendicular optical axis A; wherein said first, second and third centers of origin C1, C2 and C3 are positioned in a triangular relationship; wherein C1, C2 and C3 are located on the vertices of a hypothetical equilateral triangle wherein C1 is located on said perpendicular optical axis A; wherein C1 is located below said horizontal plane; and wherein C2 and C3 are located on a horizontal plane parallel to a plane bisecting said upper and lower lens sections.

One additional inventive embodiment of the present disclosure is a catadioptric lens assembly wherein said portion of either said upper and lower surfaces of said upper and lower lens sections is composed of materials that exhibit light scattering properties; and wherein said main lens is composed of an optically clear material.

Another inventive embodiment of the present disclosure is a luminaire or luminaire housing assembly, featuring the combination of (a) at least one light source; (b) a catadioptric lens assembly configured to receive light from at least one solid state light source; wherein said lens assembly has an upper lens section, an intermediate main lens region and a lower lens section disposed opposite the upper lens section; wherein the light from said light source is directed onto said upper lens section and is subsequently emitted from said lower lens section; wherein the upper lens section comprises a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; wherein said right and left lower transitions regions are contiguous and adjacent to said right and left edge support regions, respectively; and (c) a housing supporting said light source and said catadioptric lens assembly.

Another inventive embodiment of the present disclosure is a luminaire wherein said light source is a solid state light source selected from an LED, LED array, Lambertian emitter, $2\pi$ emitter, and fiber optic light guide.

Yet another inventive embodiment of the present disclosure is a luminaire wherein said light source is a linear light source selected from an incandescent lamp, fluorescent tube, linear LED, linear LED array, linear Lambertian emitter, and linear fiber optic light guide.

A further inventive embodiment of the present disclosure is a luminaire wherein at least a portion of either said upper or lower surfaces of said upper and lower lens sections is composed of materials having different optical properties from a main lens region located between said upper and lower lens surfaces; wherein said upper lens section comprises an upper coextruded top layer adjacent to and contiguous with said upper lens section and extending from a first left edge support region to a second right edge support region; and wherein said lower lens section comprises a lower coextruded bottom layer adjacent to and contiguous with said lower lens section and extending from a first left edge support region to a second right edge support region.

Yet another inventive embodiment of the present disclosure is a luminaire wherein at least a portion of either said upper or lower surfaces of said upper and lower lens sections is composed of materials having different optical properties from a main lens region located between said upper and lower lens surfaces; and wherein said portion of either of said upper or lower surfaces of said upper and lower lens sections comprises a contiguous film of uniform thickness of a material having different optical properties from said main lens region.

A further embodiment of the present invention is a batwing-style lens containing luminaire that has (a) at least one light source; (b) a mounting rail; wherein said mounting rail features right and left housing engagement tangs; wherein said right housing engagement tang features a right lower catadioptric lens retention surface and wherein said left housing engagement tang features a left lower catadioptric lens retention surface; (c) a housing assembly comprising a right housing side panel, a left housing side panel and a lower diffusing lens element; wherein each of said right and left housing side panels are immediately adjacent to said lower diffusing lens element and connect to said lower diffusing lens element at a right diffusing lens junction and at a left diffusing lens housing junction; wherein said right and left housing side panels each feature a housing support wing; wherein each of said housing support wings bear a mounting rail attachment tang and a lower lends engagement tang; wherein said right and left housing side panels each feature an upper mounting rail engagement tang that engages with one of said right and left housing engagement tangs located on said mounting rail element; wherein said right and left housing side panels each feature a lower lens attachment tang that engages with a right and left lower lens engagement region to secure a right and left side of a catadioptric lens element in place between each of a right and left side upper mounting rail tangs each having an upper lens engagement region, and said right and left lower engagement tangs; (d) a catadioptric lens; wherein said catadioptric lens has right and left edge support regions; wherein each of said right and left edge support regions feature a lower and upper engagement surface; and (e) a left and right luminaire end cap located adjacent to the left and right sides of said housing assembly; and (e) a power supply means capable of energizing said light source.

Another embodiment of the present invention is a luminaire wherein each of the housing support wings further comprises a light reflecting element located on a bottom facing surface of said housing support wing and extending from said diffusing lens housing junction to said housing lower lens engagement tang, the light reflecting element acting to increase the total emitted luminosity of the luminaire by redirecting internally reflecting light onto the diffusing lens element.

In additional embodiments of the present invention, the luminaire may employ a light source is selected from a point source, a linear source, and a linear array of point sources. Suitable linear light sources include an incandescent lamp, fluorescent tube, linear LED, linear LED array, linear Lambertian emitter, and linear fiber optic light guide, and for point sources, suitable light emitters include solid state LEDs, Lambertian emitters, and $2\pi$ emitters.

In some embodiments of the present invention, the luminaire's right and left housing side panels may be opaque, so that no light is emitted from the side panels, while the diffusing lens element may be optically clear or at least partially light transmitting, including being optically clear or transparent, or alternatively slightly limiting with respect to light transmission, being frosted, patterned, translucent and combinations thereof having the capability of transmitting light but not necessarily being perfectly clear.

In related embodiments of the present invention, the luminaire's right and left housing side panels may be partially light transmitting.

In yet further embodiments of the present invention, the luminaire may be terminated on one or both ends with a end cap to finish the luminaire housing assembly, and end caps may each feature a first and second end cap engagement element that reversibly secures each end cap to at least one end or terminus of the luminaire assembly.

In related embodiments to that immediately above, two luminaires may be positioned end-to-end and attached together by other means to secure the connection and provide a visually seamless connection between a first and second luminaire by using a Light Injected Terminal Lensing and Coupling Device as disclosed and claimed in copending U.S. patent application Ser. No. 16/694,435, filed Nov. 25, 2019, which acts to eliminate any visual gap in lighting between adjacent luminaires, enabling the chain coupling of luminaires in an end-to-end fashion for larger length applications exceeding the length of a single luminaire assembly.

In embodiments of the present invention, power is supplied to the light source using any acceptable means including use of wires, power leads, printed circuit boards and the like, and the electrical power as a power source may include use of a battery, control circuit, printed circuit control board, alternating current source, capacitor, and combinations thereof, capable of switching or controlling the electrical power provided by a power supply to the light source, in order to turn it on and off and to control its intensity, as desired. In related embodiments employing LED light strips, arrays and similar devices where multiple-color LEDs may be combined, the power supply may be controlled so as to energize any combination of LEDs, and control their relative emitted light intensity, so as to enable the production of any RGB (Red-Green-Blue) color in the human color spectrum of visual perception.

In further embodiments of the present invention wherein the batwing-style catadioptric lens is combined into an integrated luminaire assembly as disclosed herein, the catadioptric lens features an upper lens section, an intermediate main lens region and a lower lens section disposed opposite the upper lens section; wherein the light from said light source is directed onto said upper lens section and is subsequently emitted from said lower lens section; wherein the upper lens section comprises a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively; wherein said lower lens lobe is contiguous and adjacent to right and left lower linear transition regions; and wherein said right and left lower transitions regions are contiguous and adjacent to said right and left edge support regions, respectively. In these embodiments, the right and left edge support regions are engaged by the corresponding right and left lens engagement tangs of the present invention, secured between upper and lower engagement tangs which define right and left pairs of upper and lower engagement regions, holding the catadioptric lens securely in between by engaging the respective right and left edge support regions on their respective top (upper) and bottom (lower) surfaces. The combination of engagement tangs and their corresponding lens engagement regions serves to secure the catadioptric lens in the desired orientation and relative position for maximum alignment and spacing with respect to the light source in order to produce the optimum luminosity pattern and maximize the intensity of light emitted by the lens.

DETAILED DESCRIPTION

FIG. 1 shows a cross-sectional representation of one inventive embodiment of a catadioptric lens assembly 100. The lens assembly 100 continues longitudinally along an optical longitudinal axis B that is perpendicular to an optical vertical axis A and extends along the length of the lens assembly (not shown) for any desired length, L. The lens assembly 100 includes an upper section 101 and a lower section 109, section 101 being above the horizontal lens axis C, section 109 starting immediately below the horizontal lens axis C, as shown in FIG. 1. The upper section 101 and lower section 109 are both coplanar about the horizontal axis C, but not symmetric to this axis or a plane along this axis. The upper section and lower section are also both bilaterally centered about the vertical optical axis A that is perpendicular to the longitudinal optical axis B. The upper section includes two lobes 103 whose surfaces have a generally positively curved (convex) circular, elliptical or parabolic shape, the two lobes being bilaterally symmetric to the vertical optical axis A at a lens center transition plane 102 (see also FIG. 4 A/B plane), the distal ends of each of the two upper lens lobes 103 connecting via a upper lobe transition plane 104 to symmetric upper linear transition regions 105 on both sides of the upper section further transitioning to corresponding edge support regions 106 that terminate with outer lens edges 108. The lower section 109 features a single lower lens lobe 110 that has a generally negatively curved (concave) spherical shape, the single lobe being bilaterally symmetric about the vertical optical axis A, connecting via lower lobe transition planes 111 to symmetric linear transition regions 112 on both sides of the lower section transitioning to corresponding edge support regions 114, the upper and lower section sharing left and right edge support regions 106.

Note that in FIG. 1 and corresponding figures and descriptions of the inventive embodiments herein, only one side of a symmetric element or feature may be labeled in the figure to avoid congestion, but its left- or right-handed counterpart symmetric about the indicated axis or plane is referred to herein as X', relating to X by symmetry of projection with respect to the indicated axis or plane.

Accordingly, the inventive lens assembly 100 is bilaterally symmetric with respect to the normal or perpendicular optical vertical axis A, both left and right sides of the lens assembly being identical mirror images with respect to each other. The lens assembly 100 is linearly contiguous and uniform about its cross-section along the longitudinal axis (B) that is coincident to, and extends along the length, L.

The top surface of the upper section of the lens assembly is the area of the lens assembly that is axially closest to the light emitting source, whose axis is centered around the optical vertical axis A.

In a luminaire configuration featuring a linear array of light emitting sources, the orientation of the linear array is coincident to the optical longitudinal axis B, or in other words, is positioned parallel with the longitudinal axis B that is coincident to the length dimension of the lens assembly.

In the embodiment shown in FIG. 1, the lens assembly features a coextruded upper layer 120 attached to a proximal or top side of the extruded lens region 125, with a second coextruded lower layer 130 attached to a distal or bottom side of the intermediate extruded lens region 125. In one embodiment, the coextruded top layer 120 is contiguous with and extends along the entire top lens section 101 from the left upper linear transition region (105) to the right upper linear transition region 105 (as labeled). In another related embodiment, the coextruded top layer 120 is contiguous with and extends along the entire top lens section 101 from the left edge support region (106) to the right edge support region 106, or extends to intermediate positions between each of said right and left regions 105 and 106, respectively. Generally, neither the coextruded top layer 120 nor the coextruded bottom layer 130 extend to the extreme edge of the lens assembly 100 denoted as the left outer edge (108) and right outer edge 108 (as labeled), as the edge support regions are used to support the lens assembly and not generally exposed to, or within the optical path of light.

Figure 2:
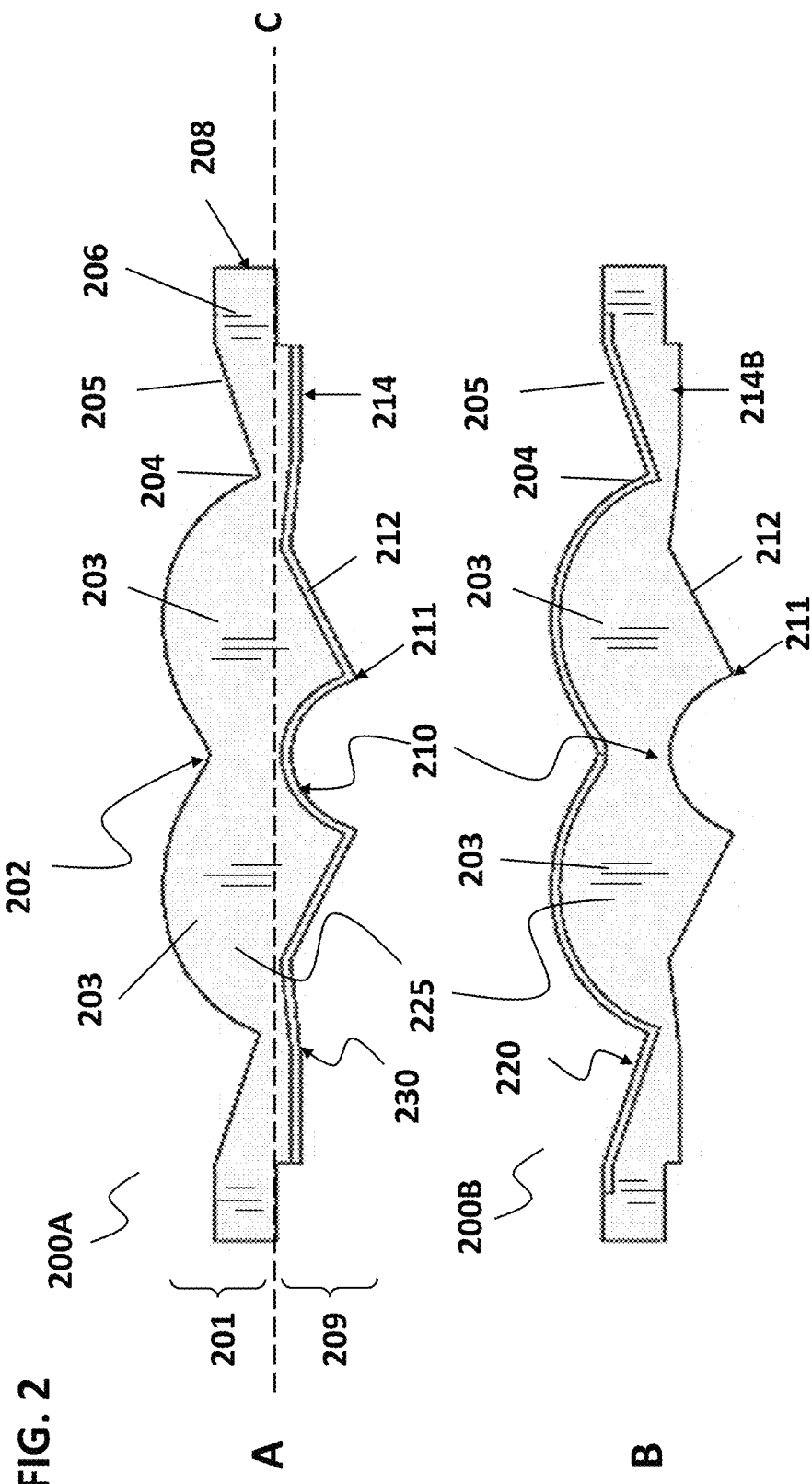
FIG. 2 shows inventive embodiments of a cross-sectional representation of a coextruded catadioptric lens assembly with either a top or bottom coextruded portion or alternatively with either a lower or upper layer.

In further related embodiments of the present disclosure, as shown in FIG. 2, the optional coextruded layers can be applied singly to one or either side of the extruded mains lens region 225, as shown in two embodiments labeled A and B. 200A shows one embodiment of the present disclosure featuring a lens assembly with lower coextruded bottom layer 230 only, with no upper coextruded layer or surface treatment to the upper section or surface of the upper lens section 201 and not modifying the surface of either of the upper lens lobes (left and right) 203 having a Lens center transition plane 202 at the junction of said upper lens lobes 202 and left and right upper lobe transition planes 104 also lacking a coextruded top layer or surface treatment in the embodiment 200A shown in example A.

A second embodiment 200B shown in example B in FIG. 2 features a coextruded lens having only a coextruded top layer 220 that is contiguous with the top surface of upper lens section 201 of extruded main lens region 225 and extends along the entire top lens section 201 from the left edge support region (206) to the right edge support region 206, or extends to intermediate positions between each of said right and left regions 205 and 206, respectively. Generally, neither the coextruded top layer 220 nor the coextruded bottom layer 230 extend to the extreme edge of the lens assemblies 200(A,B) denoted as the left outer edge (208) and right outer edge 208 (as labeled).

In related embodiments, an optional Coextruded top layer 220 and Coextruded bottom layer 230 may be formed onto the extruded main lens region 225 as either a contiguous coextruded layer or as a contiguous surface treatment the surface of the extruded mains lens region 225, said surface treatment extending across the same surface area as represented by the respective top and bottom coextruded layer regions of the lens assemblies 200 (A, B).

Figure 3:
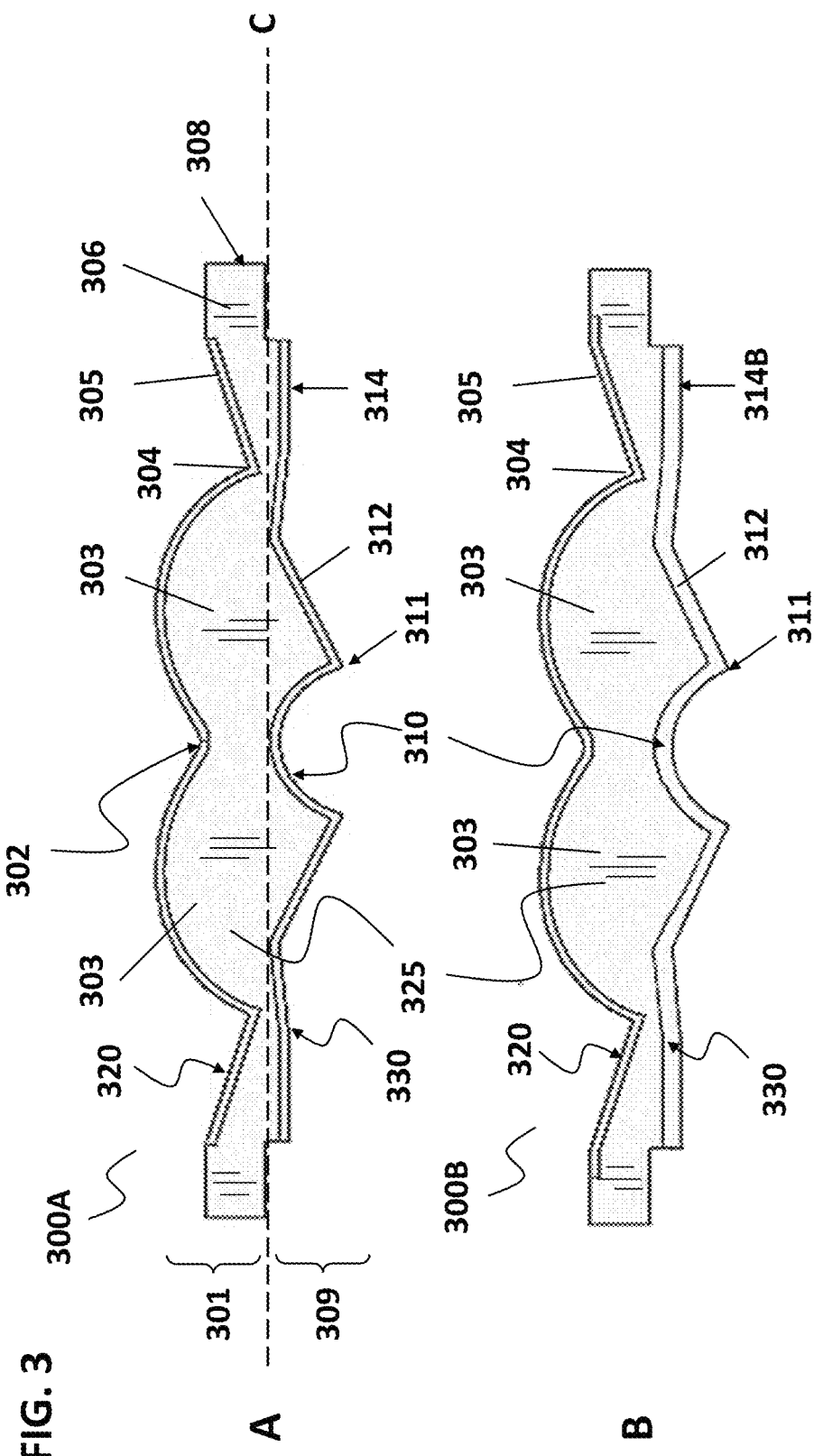
FIG. 3 shows an inventive embodiment of a cross-sectional representation of a coextruded catadioptric lens assembly or alternatively a lens assembly with upper and lower layers wherein the coextruded portions or layers have differing thicknesses.

In further related embodiments of the present disclosure, as shown in FIG. 3, the optional coextruded layers can be applied singly to one or either side of the extruded mains lens region 325, as shown in two embodiments labeled A and B. 300A shows one embodiment of the present disclosure featuring a lens assembly with both a lower coextruded bottom layer 330 only and upper coextruded layer 320 or surface treatment to the upper section or surface of the upper lens section 301.

A second embodiment 300B shown in example B in FIG. 3 features a coextruded lens having a coextruded top layer 320 that is contiguous with the top surface of upper lens section 301 of extruded main lens region 325 and extends along the entire top lens section 301 from the left edge support region (306) to the right edge support region 306, or extends to intermediate positions between each of said right and left regions 305 and 306, respectively. Generally, neither the coextruded top layer 320 nor the coextruded bottom layer 330 extend to the extreme edge of the lens assemblies 300(A,B) denoted as the left outer edge (308) and right outer edge 308 (as labeled).

In the example embodiment 300A, the coextruded top layer 320 extends to the junction of the upper transition region 305 and the edge support region 306. In the example embodiment 300B, the coextruded top layer 320 extends slightly beyond the junction of the upper transition region 305 and the edge support region 306, to a point intermediate between the outer edge 308 and the upper linear transition region 305, for both the left and right symmetric sides of the lens assemblies 300.

In related embodiments, an optional coextruded bottom layer 330 may be formed onto the extruded main lens region 325 as either a contiguous coextruded layer contacting the lower surface of the extruded mains lens region 325, said bottom layer 330 being coextruded with a greater cross-sectional thickness compared to the top layer 320. In related embodiments, the thickness of an upper or lower coextruded layer can vary according to need, from 0.001" to 0.25" in thickness for example. In related embodiments wherein the upper and lower layers are not coextruded but are applied as films or layers to a center extruded mains lens section, the thickness can also vary according to need, from about 0.001" to about 0.10" in thickness, depending on the laminate or film thickness employed. In related embodiments wherein the upper and lower layers are not coextruded but are post-treated to change their optical properties, such treatments including etching, frosting, knurling, templating and other such surface patterning techniques generally modify the surface to some depth depending on the mechanical nature of the technique, and the layer thickness would correspondingly be defined by the maximum effective depth of such treatment in creating a layer of material with differing optical properties than that of the center extruded mains lens section.

Figure 4:
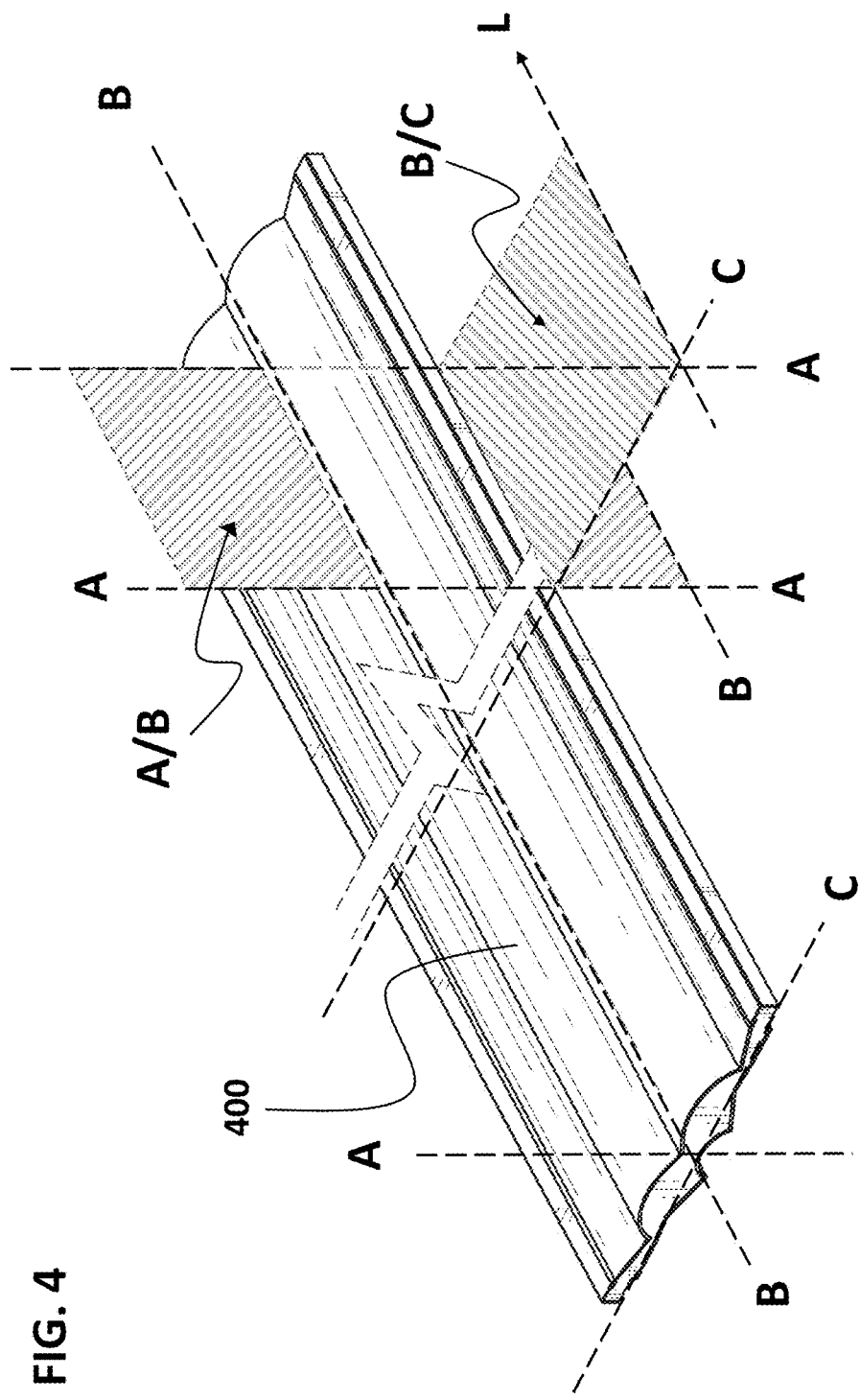
FIG. 4 shows a graphical representation of the various axis of an inventive embodiment of a catadioptric lens assembly including a normal axis A that is perpendicular to the horizontal axis C and perpendicular to the longitudinal axis C, and the associated two dimensional planes of projection about the indicated axis.

FIG. 4 shows an inventive embodiment of a lens assembly 400 with the principal axis and planes indicated by the direction of the dotted lines and hatched planes denoting the longitudinal and perpendicular planes of the lens assembly 400. Here, A is the normal (vertical) axis extending perpendicularly at a normal right angle of 90° ninety degrees from a horizontal longitudinal plane B/C that passes through the length L of the lens assembly 400, perpendicular to both the B and C axis. It can clearly be noted that the left and right side of the lens assembly 400 about the center axis is bilaterally symmetric with respect to the projected perpendicular or vertical A/B plane. Here, B is the linear or longitudinal axis and C is the horizontal or planar axis, the vertical A/B plane being normal (perpendicular) to the C axis and perpendicular to the longitudinal B/C plane. As can be surmised from this and the preceding figures is that the lens assembly 400 may be extruded or coextruded into its indicated shape and form having any arbitrary length L, being symmetric about the vertical A/B plane and continuously non-varying with respect to the extruded cross-sectional area and shape so as to be infinitely linear symmetric, or linearly translationally symmetrical along the B axis for the length L.

In operation, a linear light source or linear array of discreet light elements are positioned so the light emission emanating from the linear light source or collective array is directed downwards along the direction of the A axis onto the top surface of the lens assembly 400, the linear light source or linear array being positioned along the A/B plane at an appropriate distance of separation from the top surface of 400. A minimum distance of separation of a light source from the inventive catadioptric lens is a distance from said light source to the top saddle position or intersection of the upper lens surface with the lens center transition plane 102 sufficient for the cone of emission of the respective light source to strike the apexes of each of the right and left upper lens lobes, while a maximum distance of separation is one wherein all light rays within said cone of emission of said light source strikes the entire upper surface of the lens assembly up to but not including either the left or right side edge support regions.

Figure 5:
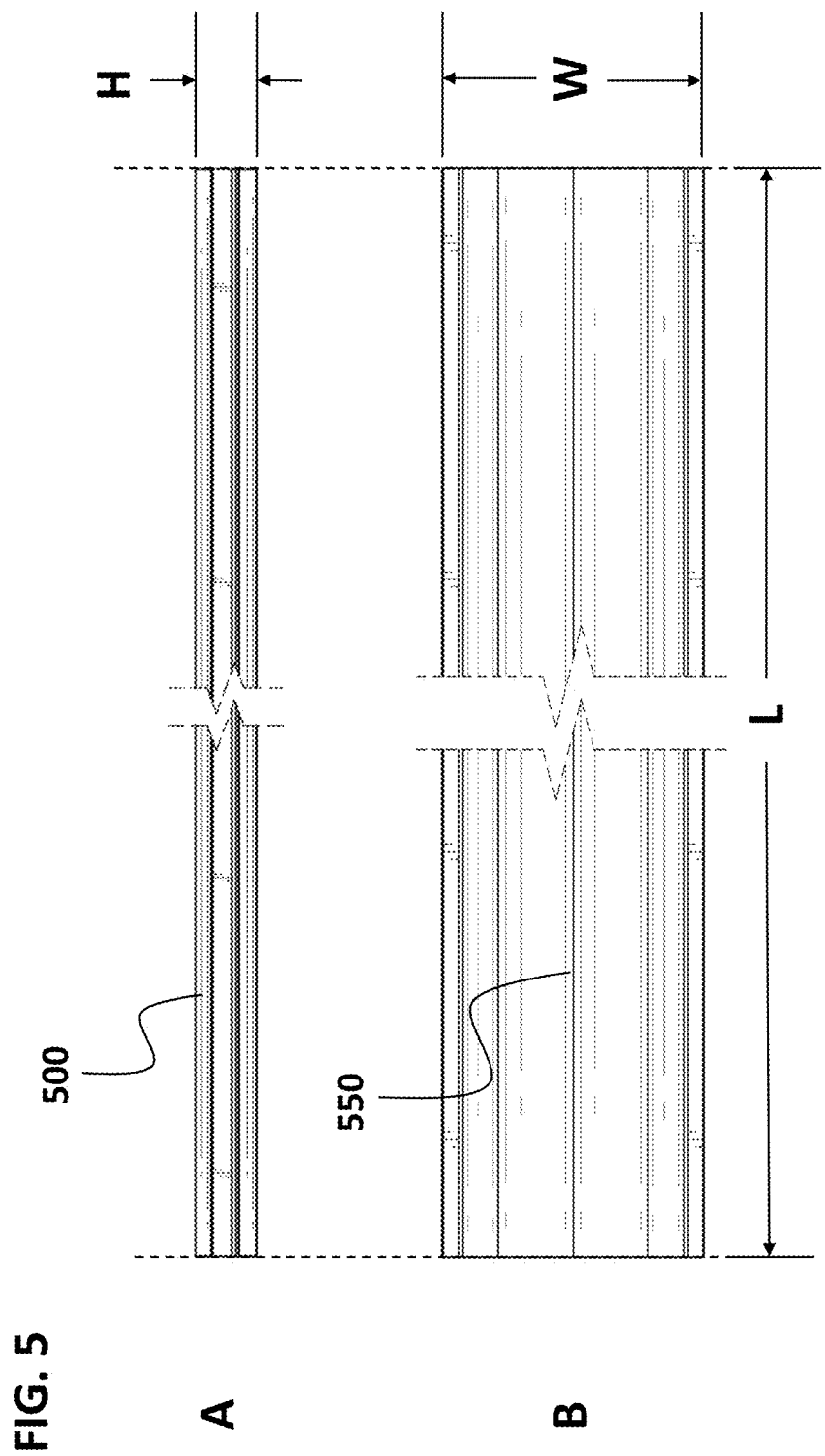
FIG. 5 shows side and top views of one embodiment of a catadioptric lens assembly with indicated dimensions.

FIG. 5 shows one embodiment of the present disclosure, a lens assembly 500 viewed from either the right or left side as shown in viewpoint A, having a maximum cross-sectional height H. Viewpoint B shows a top view 550 of the lens assembly 500, wherein W is the maximum side-to-side width, and L is the overall length of 500. L can be any desired length, generally being at least equal to or greater than the width, W to fashion a square (L=W) or rectangular (L>W) lens assembly. While all three dimensions H, W and L may vary, the relative magnitudes or ratios of parameters W and H are generally maintained at a fixed value or within a fixed range in order to preserve the unique reflective/refractive light distribution characteristics of the inventive lens assemblies disclosed and embodied herein, as disclosed later herein below in further example embodiments and in Table I.

Figure 6:
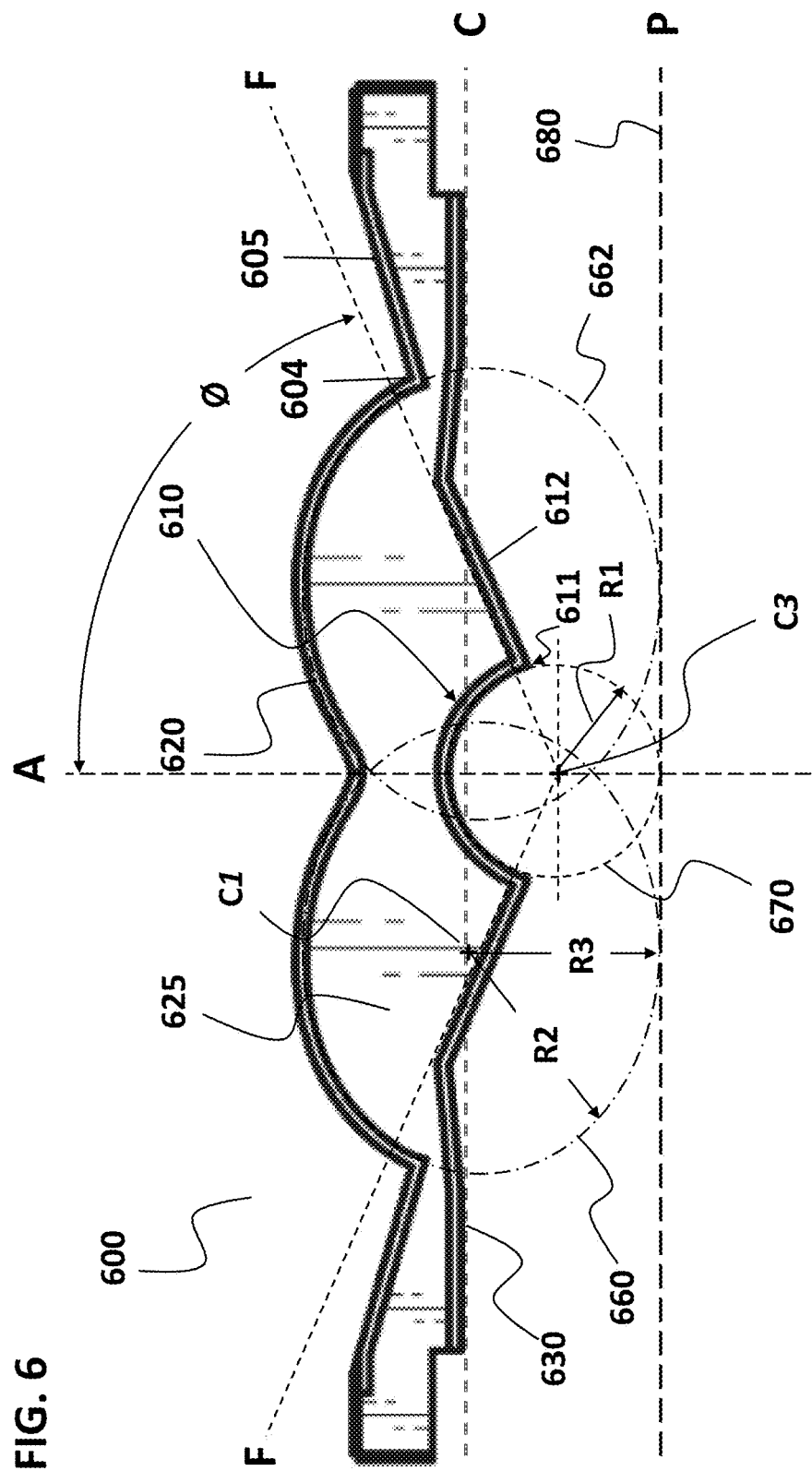
FIG. 6 shows an inventive embodiment of a cross-sectional representation of a coextruded catadioptric lens assembly having dual elliptical shaped upper lens lobes in combination with a singular circular shaped lower lens lobe with indicated centers of origin and radii.

FIG. 6 shows one embodiment of an inventive lens assembly 600 having both a coextruded top layer 620 and coextruded bottom layer 630 sandwiching an extruded main lens region 625. As seen in FIG. 6, the lens assembly 600 is bilaterally symmetric about a center plane that extends along and perpendicular to the normal or perpendicular axis A, in a linear direction L (not shown here, see FIG. 5) that further extends in a direction perpendicular to both axis A and plane C and the parallel projection plane 680 denoted as P. The inventive lens assembly 600 features two identical, bilaterally symmetric left and right upper (top) lens lobes 603 (and 603' not labelled) whose surface curvatures are circumscribed by the dotted circumferential line 660 (left) and 662 (right), which define an ellipse having a major radii R2 and a minor radii R3, as shown, the origins of each of the radii R2 and R3 are points (C1 shown, C2 not shown) that coincide with and are positioned along the planar C axis. The left and right upper lens lobes 603 are positively curved surfaces, e.g. convex with respect to the incident light injected into the lens assembly 600 from the top surface along the direction of the A axis, so that illumination is incident to the top surface of the lens assembly 600. The lower lens lobe 610 is oriented having a negatively curved surface, e.g., concave with respect to the lower surface of the lens assembly 600, shown circumscribed by a dotted circular line 670 (inscribed circle), which defines a circle having a lower lobe radius R1, wherein the center point (origin) of said circumscribed circle coincides with the normal A axis, as shown in FIG. 6, and the lower lens lobe 610 therefore also being bilaterally symmetric about the plane A/B extending along the length, L, of the lens assembly as shown in FIG. 4.

In one embodiment, the inventive lens assembly 600 is an coextruded catadioptric lens assembly featuring two positively curved convex bilaterally symmetric upper lobes located on an upper surface of said lens assembly, each of said upper lobes having an elliptical surface curvature defined by a major and minor radius of R2 and R3, respectively, in combination with a single, axially symmetric negatively curved concave lower lobe located on a lower, or opposed surface of said lens assembly, having a circular surface curvature defined by a radius R1, wherein the centers of origin (C1) of R2 and R3, and R2' and R3' (the latter not shown in FIG. 6, but having a center of origin C2) are located along the planar C axis, and wherein the center of origin of R1 (C3) is located along the perpendicular axis A, and wherein the corresponding centers of origin, C1, C2 and C3 are disposed in a triangular relationship, defining a triangle with corner vertices of said triangle being at the positions corresponding to C1, C2 and C3.

In related inventive embodiments, the inventive lens assembly 600 as shown in FIG. 6 can be produced with only a single upper coextruded top layer 620, or alternatively with only a single lower coextruded bottom layer 630, while maintaining the inventive surface curvatures that enable the catadioptric lens assembly 600 to disperse incident light in a desired uniform disperse illumination pattern.

In an alternative embodiment, the lower lens surface 614 of the inventive lens assembly 600, exhibits a lower linear transition region 612 which follows a straight line segment (E) originating at the locus of R1 on the perpendicular axis A as shown in FIG. 6, and extending either parallel to or coincident to the surface of said lower linear transition region 612, whether or not also including a lower coextruded region 630, wherein the straight line segment E originates at R1 and makes an angle designated theta (Ø) with respect to said axis A, both the left and right lower linear transitions regions 612 and 612' being symmetric about a plane drawn through the A axis and extending along the length of the lens assembly 600 (see the AB plane in FIG. 4). FIG. 6 also shows the angle theta (Ø) between the perpendicular axis A and the plane of the surface coinciding with the lower linear transition region 612, originating from C3 and starting from the point the inscribed radii R1 makes with the lower lobe 610, being the point of origin of the lower lobe transition plane 611.

In related embodiments, the inventive lens assembly can be configured in a various shapes and sizes, proportionally and symmetrically sized about a center plane AB that extends along the length, L, of an extruded or coextruded lens assembly. In these embodiments, the various radii of curvature, R1, R2 and R3 and the angle theta (Ø) defining the angle of inclination of a lower linear transition region can take on a variety of values as shown in Table I.

In further related embodiments, the two positively curved convex bilaterally symmetric upper lobes may have surfaces defined as circular, described by having a single radius of curvature, R2, with symmetric centers of origin, C2 and C3, respectively as disclosed herein. In yet other related embodiments, the two positively curved convex bilaterally symmetric upper lobes may have surfaces defined as parabolas, described by having surface shape following a parabolic relationship equivalent to $n*(R2)^2$ relationship (wherein n=non-integer numeric parabolic constant), and also having symmetric centers of origin, C2 and C3, respectively as disclosed herein.

Figure 7:
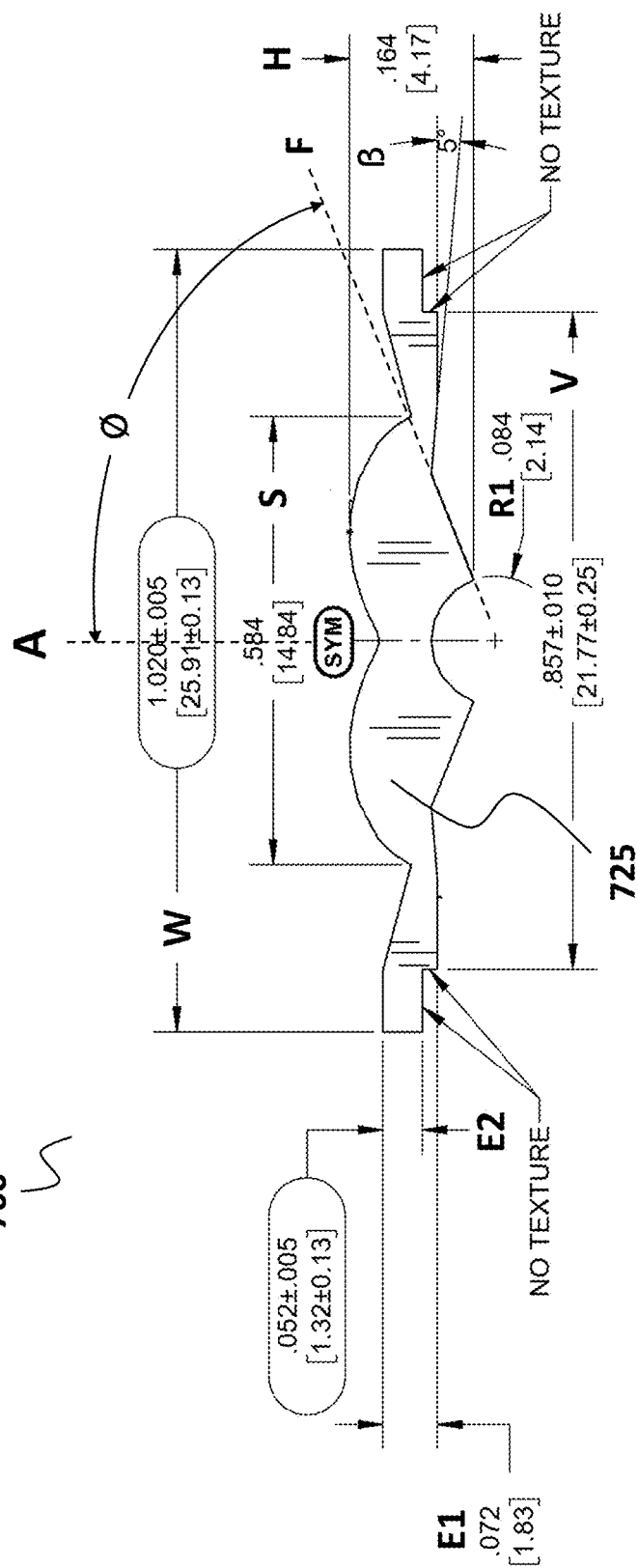
FIG. 7 shows an inventive embodiment of a cross-sectional representation of an extruded catadioptric lens assembly with example parametric dimensions, tolerances and angles of indicated surfaces about a center optical axis A.

FIG. 7 shows one embodiment of a catadioptric lens featuring only the main extruded lens region without coextruded layers. In this and related embodiments, the main extruded lens regions may be surface treated, for example but not limited to, frosting, etching, texturing, and coating, in order to increase the optical dispersion properties of the corresponding treated surface to improve the properties of the inventive catadioptric lens. In related embodiments, either the top or bottom or both surfaces of the main extruded lens region may be surface treated, generally the surface treatment being uniform over the surface and extending across the respective surfaces to the same extent as in alternative embodiments featuring a coextruded layer on the surface of said main extruded lens region.

FIG. 7 shows an inventive embodiment of an extruded lens assembly 700 showing the center of symmetry (SYM) along the perpendicular axis A and some representative size and angle parameters, and typical tolerances related to these parameters as applicable to manufacturing the inventive lenses. In FIG. 7, the overall width W of the lens assembly 700 is shown, the height parameter H being the maximum height of the lens assembly 700 at its greatest cross-dimensional thickness in a direction along the A axis, corresponding to the parallel distance of separation between either or both symmetric points located on the upper apex of both upper lens lobe's upper surfaces, as shown as the point of intersection of upper dimension line H, and the symmetric points located at the lower lob transition plane (see FIG. 1, 111) located at the junction of the lower lens lobe 110 and lower lob transition region 112. Again referring to the labeled sections, regions and edges shown in FIG. 1, the parameter S corresponds to the width of the top dual symmetric left and right upper lens lobes 103, the distance being the span of the two lobes from the left upper lobe transition plane 104 to the corresponding right upper lobe transition plane 104, each of which transition to the corresponding left and right adjacent upper linear transition regions 105. Referring to FIGS. 1 and 7, the parameter V corresponds to the length of the lower lens surface 114 but not including the length of the lower surface of the edge support region 106, this distance V corresponding to the dimension of a lens support channel in a luminaire featuring the inventive catadioptric lens assemblies disclosed herein. The edge thickness parameters, E2, refers to the thickness of the edge support region 106, while the edge tang thickness parameter E2 is equivalent to E1 minus a nominal inset drop parameter, M (not shown, but wherein M=E2−E1), which relates to the lens insert drop distance within a supporting luminaire housing that holds the inventive catadioptric lens assembly in a desired position by means of the edge tang and edge support regions of embodiments of the inventive lens assembly. In this inventive embodiment, the extruded lens assembly 700 has an edge-to-edge width of W, with an upper lobe region width S that defines the combined length of the two upper lobes, which are symmetric and meet at the normal axis A. In one embodiment, the extruded lens assembly 700 is positioned within a luminaire housing by means of suspension using the edge regions to support the inventive lens assembly. Here, the lower lens tang width V is equivalent to a dimension within a supporting luminaire that acts to hold the lens assembly 700 in position by means of suspension of the two edge regions that extend beyond the lower lens tang. Also shown in FIG. 7, E1 is the edge thickness and E2 is the edge tang thickness of the edge regions, also being symmetric across the extended lens assembly 700. In general, the edge regions and ends of the extruded lens assembly 700 are not coextruded or textured, being contiguous with and integral to the extruded main lens region 725.

Figure 8:
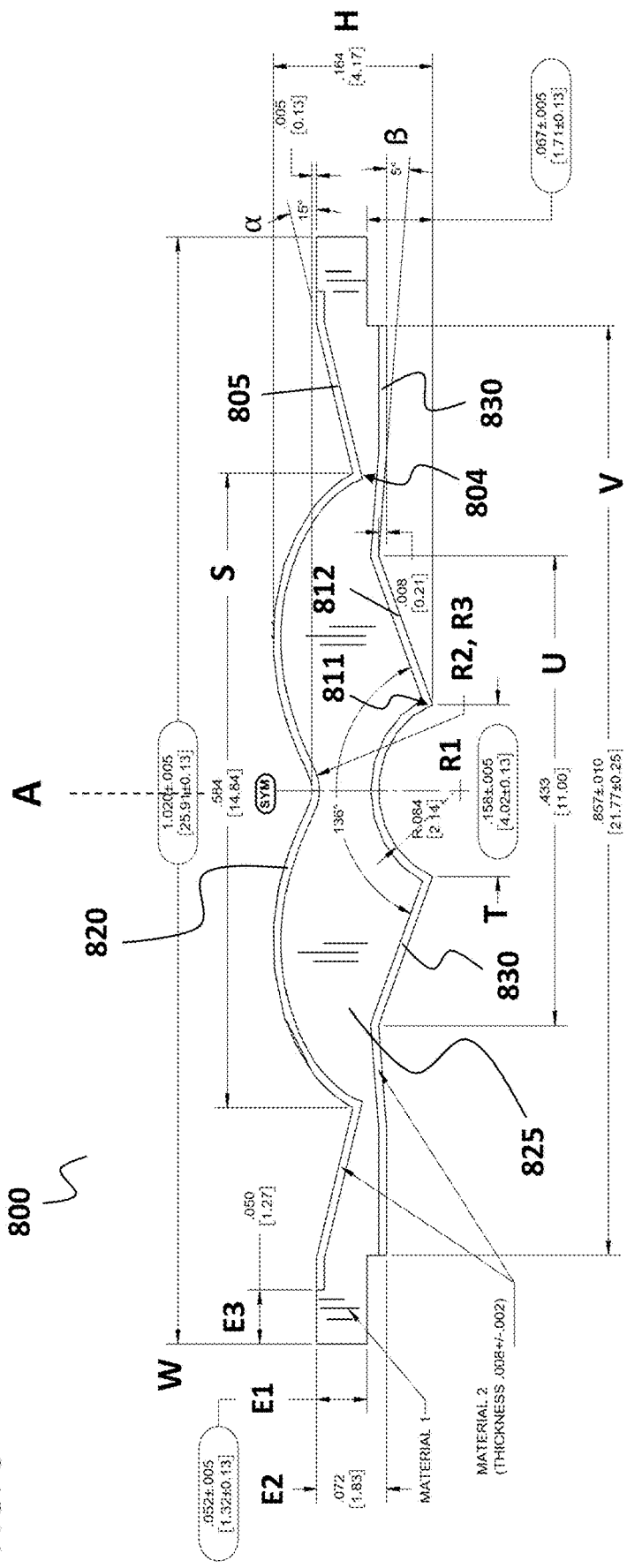
FIG. 8 shows an inventive embodiment of a cross-sectional representation of a coextruded catadioptric lens assembly with example parametric dimensions, tolerances and angles of indicated surfaces about a center optical axis A.

FIG. 8 shows another inventive embodiment of a coextruded lens assembly 800 with both an upper coextruded layer 820 and a lower coextruded layer 830 integrally formed onto the coextruded main lens region 825. In this embodiment, all elements 820, 825 and 830 are bilaterally symmetric about the perpendicular or normal axis A. W is the width of the lens assembly from a left side edge region to a right side edge region both having an edge thickness E1, an edge tang thickness E2 and an upper tang width E3, the edge regions generally being composed only of the same material as the coextruded main lens region and generally free of any surface coating, texturing or treatment. The parameter E3 represents the width of the upper surface portion of the corresponding edge regions from either terminal edge to the start of the corresponding edge of the coextruded upper layer 820, which extends along the top surface of the coextruded main lens region 825 that is contiguous with said end regions. The right and left side edge regions serve as a means to hold or suspend the inventive coextruded lens assembly 800 within a luminaire without obstruction of the extruded main lens region 825 during use. The height or thickness parameter, H, reflects the overall maximum cross-sectional height of the coextruded lens assembly 800. The parameter V represents the maximum width of the lower lens surface from a first left edge region to a second right edge region, and wherein the parameter W is equivalent to V+2*E3. The parameter S corresponds to the width of the top dual symmetric left and right upper lens lobes, the distance being the span of the two lobes from the left upper lobe transition plane to the corresponding right upper lobe transition plane, each of which transition to the corresponding left and right adjacent upper linear transition regions adjacent to the said left and right edge regions, respectively. The various angle parameters defined transition region angles and angles of one or more surfaces with respect to the indicated origin or axis. Here, the angle alpha ($\alpha$) is the angle made by the top surface of the upper lobe transition plane 804 (see FIG. 1 for reference) of the inventive extruded lens assembly 800, irrespective of whether 800 bears a coextruded upper layer or is contiguous with the extruded main lens region 825, with respect to the horizontal plane as indicated in FIG. 8, the reference horizontal plane being parallel to the projection plane P shown in FIG. 6 and the point of origin being the upper linear transition plane 804, located at the locus of intersection between the plane between the upper lens lobe 803 and the upper lobe transition region 805. This angle $\alpha$ may vary in magnitude as shown in Table I, from a typical value of 15°, including an acceptable range in magnitude of between 5° to 20°. The angle beta ($\beta$) represents the angle shown in FIG. 8, being the angle between the bottom surface of coextruded lens assembly 800 along the surface of the lower lens surface 814 and a second reference horizontal plane being parallel to the projection plane P shown in FIG. 6 and the point of origin being a plane located at the locus of intersection between the lower linear transition region 812 and the lower lens surface 814. The angle g may vary in magnitude as shown in Table I, from a typical value of 5°, including an acceptable range in magnitude of between 1° to 15°. The angle theta (Ø), as shown in Table I and FIGS. 6 and 7, represents the angle formed by the lowermost surface of embodiments of the inventive lens assembly corresponding to the lower linear transition region 612 with respect to the center of origin C3 of the lower lens lobe 610. As seen in comparison between FIGS. 6 and 7, this angle may (as illustrated in FIG. 7) or may not (as illustrated in FIG. 7) also coincide with the upper lobe transition plane 604 at the intersection of the respective upper lens lobe 603 and upper linear transition region 605, including embodiments wherein the lower lens section 609 features a coextruded bottom layer 630 or not.

Table I shows the various parameters and parametric values for inventive embodiments of the catadioptric lens assembly as shown and described herein. Table I shows the nominal value of each parameter as well as the nominal tolerance found acceptable in actual production and manufacturing process to produce the inventive lens system. Also shown are the normalized values of the parameter, normalized with respect to the larger dimensional factor, W, which corresponds to the maximum width of the inventive lens assembly. Other parameter values are normalized with respect to this dimension for each in proportional scaling of embodiments of the inventive disclosure depending on the ultimate size and dimensions desired. Despite the normalized values shown in Table I, the far right column also shows typical ranges for each of the indicated lens parameters, being acceptable dimensions as appropriate to the application. Variations in some select parameters naturally require modification of another parameter value, so also shown in Table I in terms of generalized limits which restrict a parameter value to the indicated relative dimensional constraint, or which indicate a minimum or maximum value of that parameter, or a minimum, equivalent or maximum value of that parameter as constrained by another parameter.

TABLE I

Catadioptric lens assembly parameters

| Lens Parameter (1) | Nominal Value (2) | Nominal Tolerance (+/−) (3) | Normalized Value (4) | Ranges & Limits (Normalized) (5) |
|---|---|---|---|---|
| H | 4.17 | 0.10 | 16.1 | 10-20 |
| S | 14.84 | 0.13 | 57.3 | 40-70 |
| T | 4.02 | 0.13 | 15.5 | 10-20, T < U, $T_{max}$ = 2 * R1 |
| U | 11.0 | 0.43 | 42.5 | 35-55, U < S |
| V | 21.77 | 0.25 | 84.0 | 70-95, V < W |
| W | 25.91 | 0.13 | 100 | W (6) |
| L | 100 | 0.25 | L (7) | L, L > W |
| E1 | 1.32 | 0.05 | 7.06 | 5-9 |
| E2 | 1.83 | 0.05 | 5.10 | 3-7, E2 < E1 |
| E3 | 1.27 | 0.05 | 4.9 | 3-6 |
| M | 0.51 | 0.05 | 1.97 | =E1-E2 |
| R1 (8) | 2.14 | 0.05 | 8.26 | 6-10 |
| R2 (8) | 4.13 | 0.05 | 15.9 | 10-20 |
| R3 (8) | 4.00 | 0.05 | 15.4 | 10-20, R3 > R1, R3 ≤ R2 |
| α | 15° | 1-2° | 15° | 5-20° |
| ß | 5° | 1-2° | 5° | 1-15° |
| ∅ | 70° | 1-2° | 70° | 50-80° |

(1) As shown in FIGS. 6, 7 & 8
(2) In centimeters (cm)
(3) Maximum acceptable tolerance
(4) Normalized with respect to parameter W for proportional scaling
(5) Range of parameter values, with respect to normalized parameter W
(6) Width is any desired value, generally W ≥ 5 cm to about 100 cm.
(7) Length is any desired value, generally L ≥ W for a single LED luminaire
(8) Generally R2 ≥ R3 and R2, R3 > R1

Figure 9:
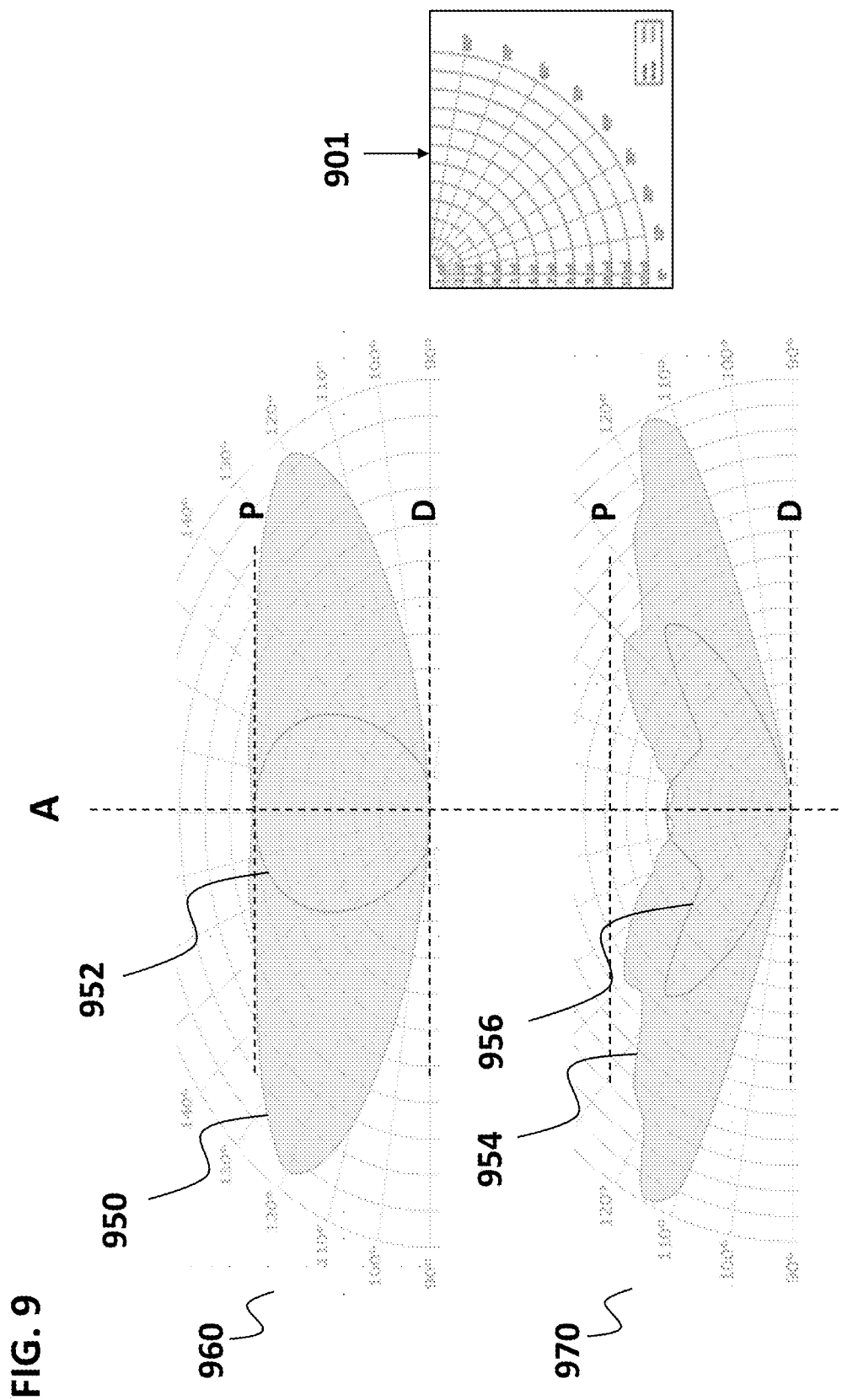
FIG. 9 shows polar radiance plots of two embodiments of the inventive catadioptric lens assembly when a source of incoming or incident irradiation is supplied along the optical axis A.

FIG. 9 shows the polar radiance plots of two embodiments of the inventive catadioptric lens assembly when a source of incoming or incident irradiation is supplied, positioned above the lens assembly and oriented along the perpendicular or normal axis A, with respect to the horizontal plane D, coinciding with a plane of incident light originating from the point source at a position corresponding to the intersection of axis A and plane D, as directed onto an illumination plane, P.

In FIG. 9, the inset key 901 shows the relative radiative intensity with corresponding circular grid lines corresponding to candelas (units of cd), wherein a candela is the base unit of luminous intensity in the International System of Units (SI) corresponding to the luminous power per unit solid angle emitted by a point light source in a particular direction, each successive circular grid corresponding to a candela unit of 1.0 in luminosity at the angle shown. Luminous intensity is analogous to radiant intensity, but instead of simply adding up the contributions of every wavelength of light in the source's spectrum, the contribution of each wavelength is weighted by the standard luminosity function, a model of the sensitivity of the human eye to different wavelengths, a reference frequency chosen to be in the visible spectrum near green, corresponding to a wavelength of about 555 nanometers where the human visual perception of color is heightened under daylight conditions or typical levels of illumination found within a home, building, office space or industrial environment requiring adequate lighting.

The angular grid lines in FIG. 9 correspond to the angular direction of the outgoing or emitted irradiation with respect to the normal axis A, measured in radial units of degrees (°).

In FIG. 9, the lower luminosity plot 970 shows the luminosity of one embodiment of the inventive lens assembly featuring only an extruded main lens region without any surface texturing or modification or a coextruded main lens assembly with either or both of a coextruded upper or lower layer being optically clear, representing a "clear" lens configuration. Plot 970 features the total illumination zone 954 and a central illumination zone 956, representing approximately an envelope corresponding to a collective 50% of the total luminosity of zone 954. The central illumination zone 945 is somewhat irregularly shaped and the projected luminosity on the projection plane P would correspondingly not be as uniform as the upper luminosity plot 960, which is a more preferred embodiment.

Plot 960 shows the luminosity envelop of a second embodiment of an inventive lens assembly featuring a coextruded lower lens layer having a medium surface texture providing a medium level of diffusion. In this latter embodiment, the total illumination zone 950 is more uniform across the plot and covers a larger area of luminosity than the first embodiment 960. In addition, the medium diffusing second embodiment produces a very uniform and nearly circular central illumination zone 952 within the illumination zone 950, both of which extend to the desired projected illumination plane P, resulting in a more uniform illumination pattern on plane P with medium diffusivity being provided. A nearly identical effect is produced by applying a surface texturing to produce a similar extent of diffusion to a lower surface of a single extruded main lens region. Further, a nearly identical effect is produced by applying a surface texturing to produce a similar extent of diffusion to an upper surface of a single extruded main lens region, or wherein a textured, patterned or frosted coextruded top layer is present. In other embodiments, a desired uniform and nearly circular central illumination zone is produced provided that either a coextruded top layer or bottom layer is present that has differing optical properties, including but not limited to, opacity, optical density, surface texturing, frosting, hazing or patterning, than the underlying coextruded main lens region. In yet further related embodiments, a desired uniform and nearly circular central illumination zone is produced provided that either an upper (top) or lower (bottom) surface of a single main lens region is treated to produce one or more differing optical properties, including but not limited to, opacity, optical density, surface texturing, frosting, hazing or patterning, than the underlying extruded main lens region, including one or more coatings, films or layers thereon.

Although not shown here, a slight deviation of from 1° to about 15° of the incident angle of incoming irradiation with respect to the perpendicular or normal axis A, results in a fully acceptable central illumination zone, the inventive catadioptric lens assemblies disclosed herein being very robust in the production of a uniform plane of illumination even with some misalignment between the incident light source (a point or linear array of point light sources) and the inventive lens assembly when positioned within a supporting luminaire.

In addition, the distance of separation between the incident light source and the top of the inventive lens assembly can vary as well while producing an acceptable uniform central illumination zone, which tends to expand in size with increasing distance between the light source and the lens assembly. These features of the disclosed embodiments of the inventive catadioptric lens assembly provide for ease in the assembly and orientation of the component parts of a luminaire using the inventive lens assembly, as slight misalignments and the distance of separation can be varied without significantly impacting the overall performance of the assembly in producing a uniform illumination zone.

Figure 10:
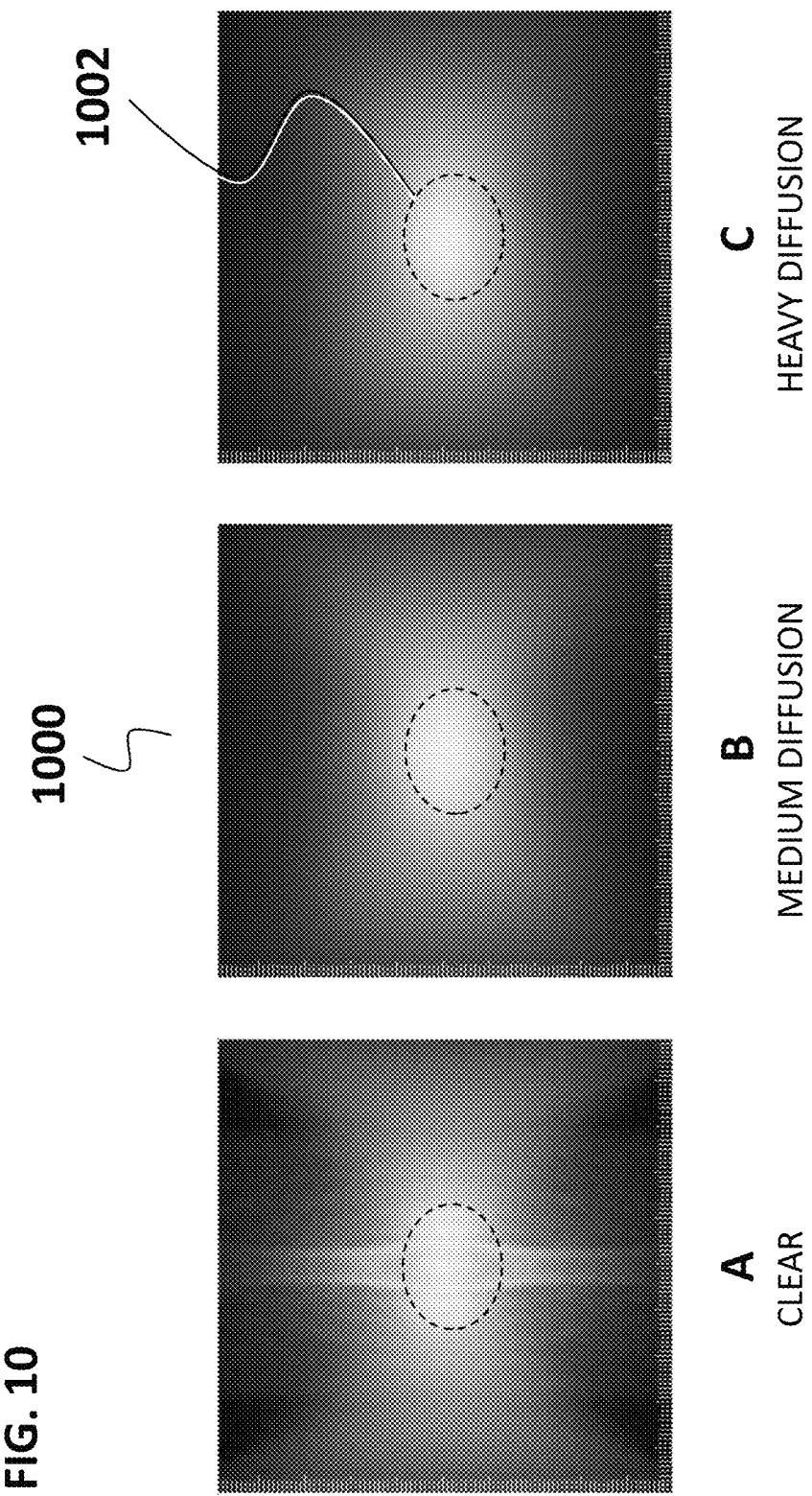
FIG. 10 shows luminosity plots of several embodiments of the inventive catadioptric lens assembly with a single pixel or point light source providing incident radiation, the lens assembly having differing degrees of diffusion.

FIG. 10 shows luminosity plots 1000 representative of a single pixel or point light source providing incident radiation to three embodiments of the inventive lens assembly, a first lens assembly A that is optically clear, a second lens assembly B featuring a single coextruded layer having a medium diffusivity, and a third lens assembly C featuring a single coextruded layer having a heavy diffusivity. As can be seen in FIG. 10, the central illumination zone 1002 becomes more uniform and regular as the extent of diffusivity is increased from clear to heavy diffusion. Similar results are seen when example embodiment C is replaced by an inventive embodiment featuring two coextruded layers each having only a light or medium diffusivity. In a linear array of multiple, evenly spaced light sources, such as a linear LED light source, the individual pixel illumination zones shown in FIG. 10 overlap sufficiently with typical inter LED spacing so as to product a uniform, linear illumination zone symmetric about and extending along the B longitudinal axis or length of the inventive catadioptric lens assembly according to the present disclosure and embodiments described herein.

Process & Materials of Optical Lenses

Any suitable materials can be used and employed to construct and fabricate the inventive lens assemblies described herein. Any material capable of suitable light transmission or refraction is suitable, including for example, but not limited crystalline and fused materials, glass, polymers, resins and combinations thereof. One non-binding example is polymethylmethacrylate (PMMA) recognized in the art as an inexpensive but optically suitable material that can be produced with high quality and having excellent optical properties well suited for lighting applications. Other polymers known in the art are also suitable, including meltable (fusion) polymers and resins suitable for injection processing as well as thermoset polymers capable of being molded in place or molded with heat or radiation to complete cross-linking and setting. Being linearly contiguous, an extrusion process is a convenient process to fabricate the inventive lens assemblies disclosed herein, included the main extruded lens segment as well as coextruded portions or layers that can be formed contiguously during the extrusion process by using multiple injection nozzles shaped and positioned accordingly to form the portions of the inventive lens assembly as disclosed hereinabove. Other processes to produce the inventive lens assemblies that are known in the art, including but not limited to, casting, layering, lamination, molding, 3-D printing and sintering of suitable optical materials are also acceptable for use in the manufacture of the catadioptric lenses disclosed herein.

The lens materials may include multiple materials that have different optical properties, but which may be combined together seamlessly or with an optical cement or adhesive to form the compound contiguous lens assemblies shown and described herein. The lens materials may be different materials, for example, different polymers or a combination of a center lens of a first material and second upper or lower layers of a second or third material, respectively.

The various lens materials employed can be the same material, but have the same or different refractive indexes and other optical properties. In some embodiments, the mains lens portion or region is formed from an acrylic resin or PMMA, but the upper and lower layers are applied as a skim coat to simulate a texture finish on an injection molded process. In a related embodiment, the upper and lower surfaces of a single extruded main lens region is surface treated to effect such a modified optical layer on the selected surface by means disclosed herein.

Luminaire Assembly

FIGS. 11-15 and the discussion hereinbelow further describe additional embodiments of the present invention relating to luminaires employing the batwing-style catadioptric lenses to provide more improved lighting systems with improved uniformity of illumination.

Figure 11:
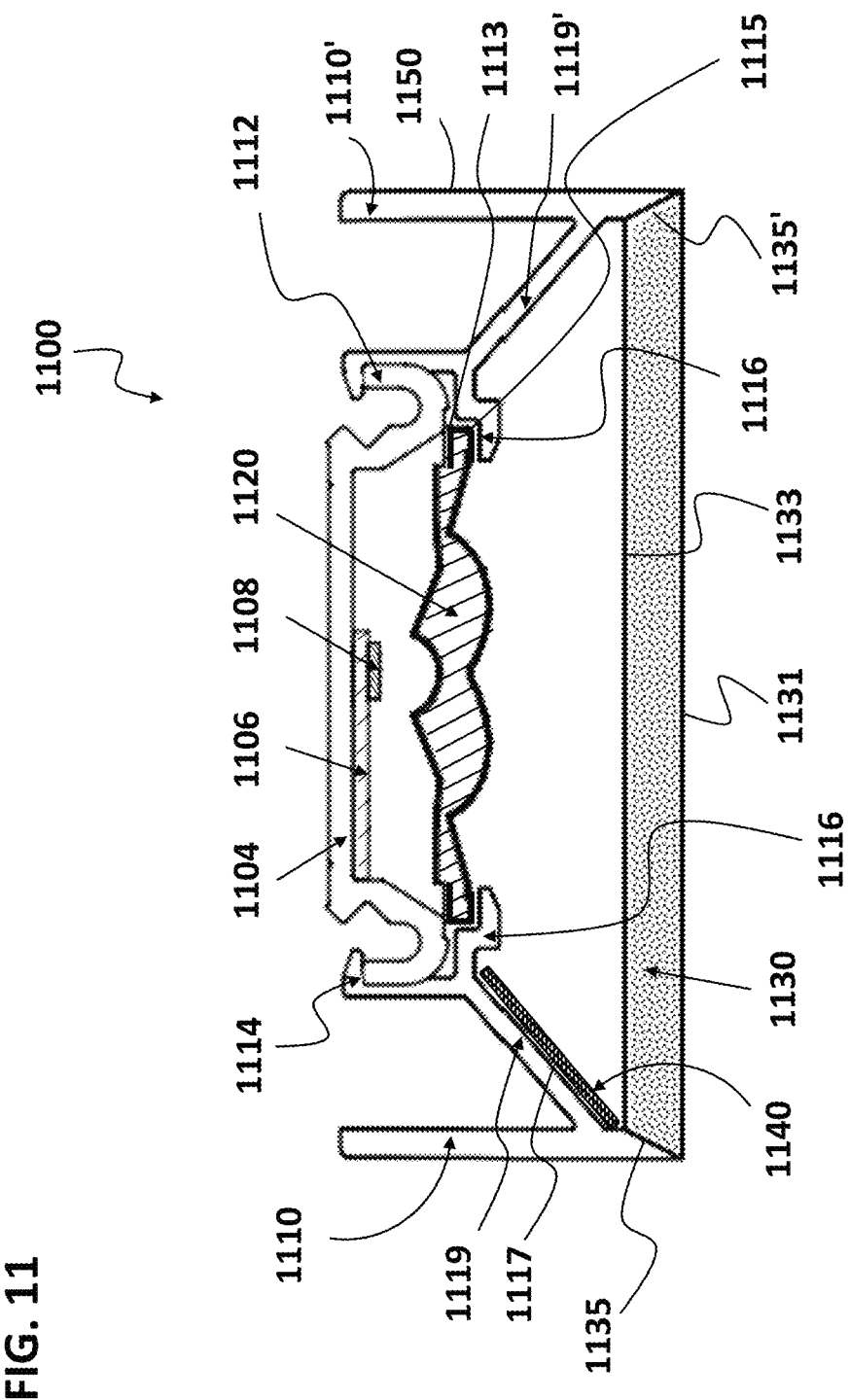
FIG. 11 shows a cross-sectional end view of a batwing-style catadioptric lens containing luminaire assembly.

FIG. 11 shows a cross-sectional end view of one embodiment of a batwing luminaire assembly 1100 that is supported by and made attachable to a flat surface, such as a ceiling or wall or suspendable therefrom by means of an extruded mounting rail 1104 that runs along the length of the batwing luminaire assembly as shown in more detail in FIG. 12 hereinbelow. Assembly 1100 features a mounting rail 1104 that engages a luminaire channel assembly 1102 that comprises the combination of elements 1130 and 1150, a batwing-style luminaire diffusing lens element 1130 that is positioned intermediately between (on each side thereof) and immediately adjacent and perpendicular to a first and second luminaire outer housing side panel 1150, 1150' respectively, so as shown in this embodiment to form a single continuous luminaire channel assembly 1102, which houses and supports batwing lens element 1120. In related embodiments, the elements 1130, 1150 and 1150' can be joined together by any suitable means at the junctions 1135 and 1135'.

In the example embodiment shown in FIG. 11, the extruded mounting rail 1104 hosts an LED illumination element 1108 that is located approximately at the center line or middle of 1104 so that the light emitted from the LED 1108 over a range of angles is injected into the batwing lens element 1120 at its center or primarily along a normal or perpendicular direction thereto corresponding to the upper cusp region of the lens element 1120 in order to provide uniform illumination of the lens element 1120. The light emitted from the LED 1108 in operation is refracted (and to some extent further internally reflected) by the batwing lens element 1120 in a downward direction (in reference to the illustration in FIG. 11) so as to impinge on the luminaire diffusing lens element 1130, the light being focused and directed by the lens element 1120 onto the upper or inner surface 1133 of 1130, so that a uniform illumination field is provided and emitted by the lower or outer surface 1131 of 1130, thus providing a highly uniform and even illumination from the lower side of the batwing luminaire assembly 1100 when the LED is powered by means of a power coupling element 1106 located on the lower or inner surface of the extruded mounting rail 1104, the power coupling element 1106 being connected to a switchable power source (not shown) sufficient to power the LED element 1108.

As shown in one embodiment of the instant invention in FIG. 11, the extruded mounting rail 1104 features a right and left mounting rail side tang 1112 and 1112' that frictionally engage with corresponding right and left mounting rail attachment tangs 1114 and 1114' in order to secure 1104 to the luminaire channel assembly 1102. In addition to the mounting rail attachment tangs, a pair of right and left housing lower lens engagement tangs 1116 and 1116' act to secure the batwing lens element 1120 in place in a horizontal orientation that is parallel to the orientation of the extruded mounting rail 1104, by securing the extreme right and left sides of batwing lens element 1120 between a lens upper engagement region 1113 located on the bottom or lower surface of the mounting rail side tang 1112 and the lens lower engagement region 1115 located on the upper surface of the housing lower lens engagement tang 1116, respectively for the right and left side of the intermediately positioned batwing lens element 1120, holding it securely in place and in a fixed horizontal orientation, so that the batwing lens element 1120 is properly spaced at a receptive distance from the LED element 1108 so as to receive illumination emitted by 1108 on the upper surface of 1120.

According to one embodiment of the instant invention, the luminaire channel assembly 1102 comprises a right and left side extruded side panel, 1110 and 1110' as illustrated in FIG. 11 that may be constructed of a material suitable for extrusion molding from a corresponding die having the cross-sectional molded outlet design as shown, so as to produce the extruded side panels in a continuous means. In related embodiments, while these components may be made by an extrusion process, any otherwise suitable means of fabrication is also acceptable, including casting, molding, impressing, 3D printing, sintering or the like, including any processes capable of producing the desired properties as disclosed herein.

Plastic, polymers and metals such as aluminum and its alloys are non-limiting examples of material of construction suitable for manufacturing these parts. In addition to the right and left side panels, the luminaire channel assembly 1102 also features a coextruded diffusing lens element 1130 joined by any suitable joinder means along both right and left diffusing lens housing junctions, 1135 and 1135' located at the lower angled right and left sides of the receptive extruded side panels, 1110 and 1110' respectively. In a preferred embodiment, the three components of the luminaire channel assembly 1102, namely a right 1110, a left 1110' and a bottom 1130 are joined together to form a visually seamless connection. The diffusing lens element 1130 is typically a different material, preferably being a clear, translucent or light-transmissive material capable of reflecting, refracting and/or transmitting light from an upper surface 1133 to a lower surface 1131 of the diffusing lens element 1130. In a preferred embodiment, the diffusing lens element 1130 may be made by an extrusion process, otherwise any suitable means of fabrication is also acceptable, including casting, molding, impressing, 3D printing, sintering or the like, including any processes capable of producing the desired properties as disclosed herein.

In preferred embodiments, the three components of the luminaire channel assembly 1102, namely right 1110, a left 1110' and a bottom 1130 are joined together to form a visually seamless connection with respect to the outer right and left surfaces 1150, 1150' of the corresponding right and left side panels 1110 and 1110' so that the junction between the right and left sides and the diffusing lens element is at least gapless, if not visually apparent to the eye, depending on the choice of materials used to fabricate 1110 and 1130. In one embodiment, the side panels are opaque and non-light transmissive, while in other embodiments, only the diffusing lens element 1130 is light-transmissive.

In other embodiments, the luminaire channel assembly 1102 may be constructed of a single extruded component in which the three component pieces are made together by co-extrusion and joined together by any suitable means.

In yet further embodiments, the luminaire channel assembly 1102 may be constructed of a single extruded component in which the three component pieces are a single continuous piece formed as a unit as a single extruded portion. In these latter embodiments, the luminaire channel assembly 1102 would preferably be constructed of a clear, translucent or otherwise light-transmissive material.

In the embodiment shown in FIG. 11 and related embodiments disclosed herein, light emanating from the LED element 1108 impinges on the upper surface of the batwing lens element 1120, which because of its unique and innovative properties caused the incident light to be refracted, internally reflected and ultimately transmitted through the lens to emanate from the lower surface of the lens 1120 to product a uniform field of illumination that then impinges in turn onto the upper surface 1133 of the diffusing lens element 1130 and then subsequently the light is emitting from the lower surface 1131 of 1130 into space to create an extremely uniform field of illumination below the batwing luminaire assembly. In some embodiments, one or more optional light reflective elements, 1140 and 1140' may be positioned on the lower side of the right and left housing support wings 1119 and 1119' so as to redirect any light emitting onto them by the batwing lens element 1120 onto the upper surface 1133 of the diffusing lens element 1130 in order to increase the overall efficiency of light transmission from a batwing luminaire assembly 1100 featuring the added light reflecting elements 1140, 1140'.

Figure 12:
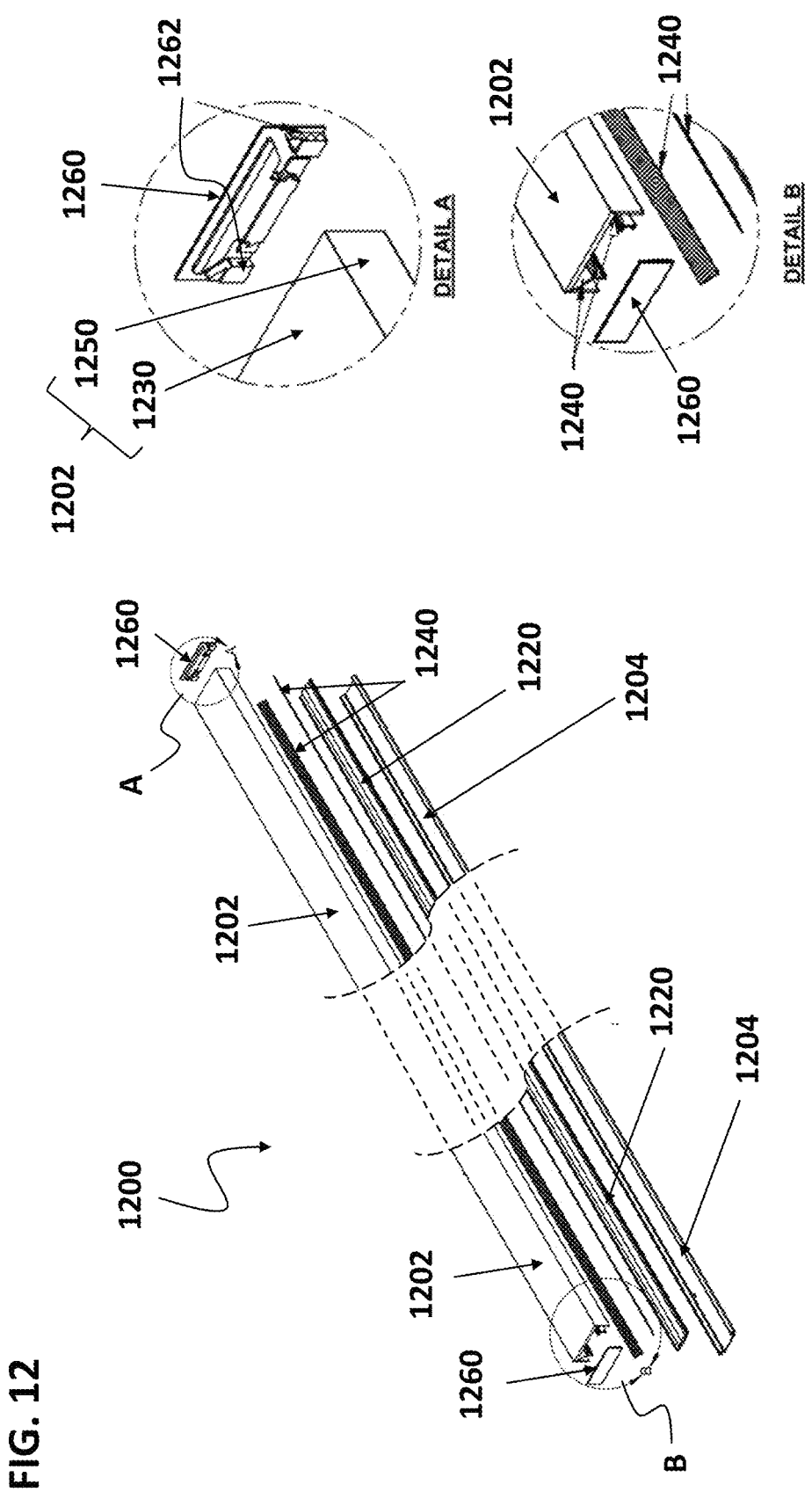
FIG. 12 shows an exploded view of the components of a batwing-style catadioptric lens containing luminaire assembly.

FIG. 12 shows an exploded view of the components of one embodiment of a batwing luminaire assembly prior to assembly. Here, a batwing luminaire assembly (exploded view) 1200 is shown in its component pieces, including a Luminaire channel assembly 1202 which is constructed as discussed hereinabove by the combination of two extruded side panels, 1250 and 1250' (not shown) and a diffusing lens element 1230, shown in the left illustration and also in Detail A. Also included is the extruded mounting rail 1204 and the batwing lens element 1220. A pair of optional light reflecting elements (1240, 1240') may be positioned on a receptive surface within the luminaire channel assembly 1202 as discussed above in related embodiments in order to increase overall light transmission from the assembly luminaire, positioned as shown in Detail B. Also shown are a first and second luminaire end cap, 1260 and 1260' in the left illustration and in Detail A and B, which may be secured to the respective first and second (left and right) ends of the luminaire channel assembly 1202 by means of a pair of end cap engagement elements 1262 (and 1262').

It is noted that the relative lengths of the various linear components, 1202, 1230, 1250, 1220, 1204 are selected to be the same, so that upon assembly, the various components may be combined to form the batwing luminaire assembly 1202 with a first and second end featuring the flush termination of each of said linear components, enabling the placement of a first and second luminaire end cap to complete the assembly, resulting in a visually seamless and continuous by appearance construct without apparent gaps between the components. In one embodiment, the collective components of the batwing luminaire assembly 1200, namely portions 1202, 1220, 1204 and end caps 1260, 1260' are shaped and configured to enable them to be friction-fit together (snap fit) without the need for any other securement means, such as adhesive or bonding, to hold the components together in a relatively rigid configuration in which the central batwing lens element 1220 is positioned centrally with respect to the other components in a linear fashion coincidence to the major horizontal length of the assembled batwing luminaire 1200, so that the optic axis of the batwing lens coincides with the linear LED or along a coincident linear axis of a plurality of individual LEDs or an LED array as the LED illumination element 1108, which is mounted centrally to an inside facing surface of the extruded mounting rail 1204.

In one embodiment, the batwing luminaire assembly 1202 may be mounted to a flat, horizontal surface such as a ceiling or a flat vertical surface such as a wall or floor. In other embodiments not shown, the batwing luminaire assembly 1202 may be mounted by other means, for example including but not limited to suspension by means of one or a plurality of cables or similar suspension elements connecting the extruded mounting rail 1204 to a ceiling or other points of connection so that the assembly 1202 is suspended from a ceiling or overhead supports in an approximately horizontal orientation so that the emitted light can illuminate a surface or space located below. In other related embodiments not shown, the batwing luminaire assembly 1202 may be mounted on poles or other support surfaces connecting 1202 to a wall, ceiling, floor or other surface using one or more of a plurality of more rigid support means, including but not limited to posts, columns, offsets, poles and the like, spaced adequately and in requisite number to support the weight of the assembly 1202 without undue sagging, bending or deflection when mounted. In other related embodiments, any other suitable means of supporting the batwing luminaire assembly 1202 by means of the extruded mounting rail 1204 can also be employed, the number and positioning of said means depending on the length of the assembly 1202 and its respective weight in light of the desired illumination effect desired by the user.

Figure 13:
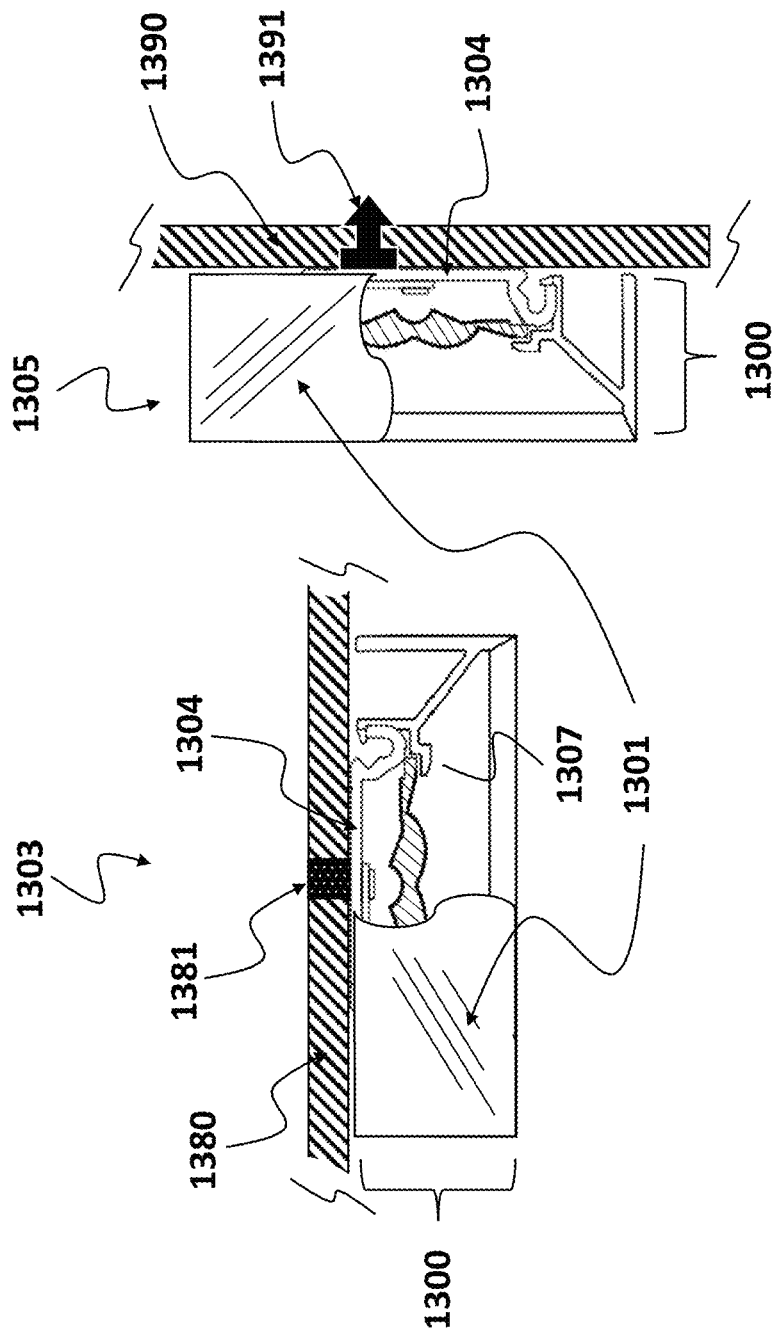
FIG. 13 shows horizontal and vertical contact mounting configurations of a batwing-style catadioptric lens containing luminaire assembly.

FIG. 13 shows several embodiments of additional mounting and suspension means for a batwing luminaire 1300, including a batwing luminaire in a parallel (with respect to ground) configuration 1303 and a batwing luminaire in a vertical configuration 1305, such as mounted to a wall or perpendicular with respect to ground.

In the embodiments shown in FIG. 13, a partial cutaway view 1301 of the end cap shows the internal configuration 1307 of the batwing luminaire assembly. In the parallel configuration 1303, a coupling element 1381 attaches to an upper surface of the extruded mounting rail 1304 and in turn attaches to a portion of a ceiling, 1380, the coupling element 1381 being one or a plurality of similar elements as required to adequately secure the batwing luminaire to the ceiling against gravity. Coupling elements 1381 include, but are not limited to, conventional mounting means such as bolts, pins, screws, rivets, and other machines capable of securing the extruded mounting rail 1304 to a second, desired surface or portion thereof where the weight of the batwing luminaire assembly should be supported.

In a second embodiment, the batwing luminaire assembly 1300 may be mounted in a vertical configuration 1305, suitable for mounting to a vertically oriented surface 1390 such as a wall or cubicle wall section, post or other at least partially flat and vertically oriented surface. In this embodiment, coupling element(s) 1391 include, but are not limited to, conventional mounting means such as bolts, pins, screws, rivets, and other machines capable of securing the extruded mounting rail 1304 to a second, desired surface or portion thereof where the weight of the batwing luminaire assembly is to be supported with some additional support provided by the frictional interaction between the extruded mounting rail 1304 and the surface 1390 to which the batwing luminaire assembly 1300 is attached. In this mounting configuration 1305 shown, the coupling element 1391 attaches to the outside or exterior face of the extruded mounting rail 1304, and acts as a means of securing 1304, and hence the complete batwing luminaire assembly 1300 to a vertical or vertically oriented surface 1390.

Figure 14:
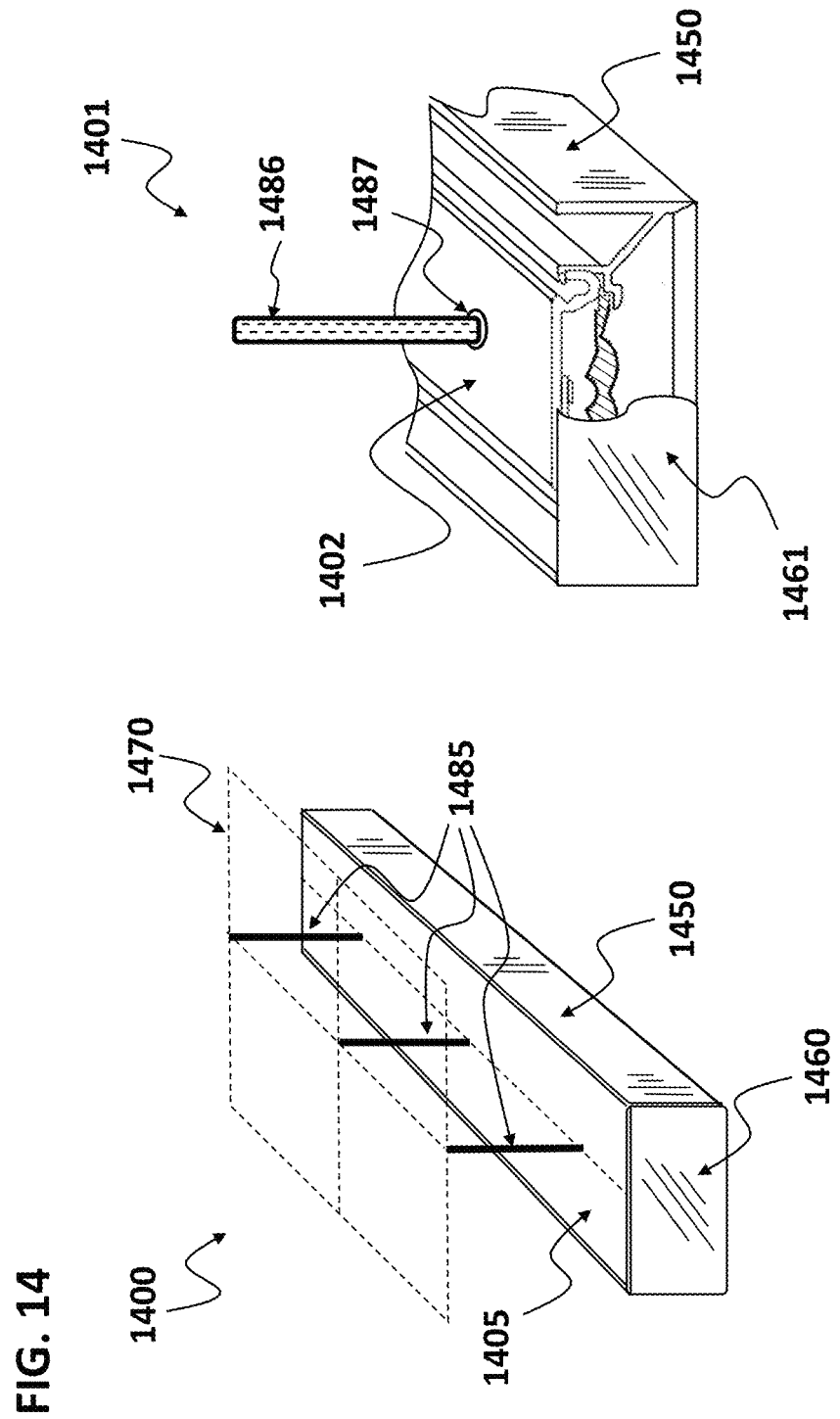
FIG. 14 shows suspension mounting configurations for a luminaire assembly.

FIG. 14 shows two embodiments of a batwing luminaire assembly being mounted by means of suspension 1400, using one or a plurality of flexible cables 1485, or by suspension 1401 using one or a plurality of rigid rods 1486. In a first embodiment, 1400, the batwing luminaire may be suspended below a ceiling surface (ceiling plane), illustrated by dotted lines 1470, the central dotted lines showing a representative horizontal axis of symmetry running the length of the batwing luminaire, along which the plurality of flexible cables 1485 that may be oriented and placed in order to support the suspended batwing luminaire assembly. The flexible cables 1485 may include, but are not limited to, wires, electrical cables, ceiling hangers, combinations thereof, and the like, including any mounting means typically used to support and/or provide electrical power to a suspended lighting system such as in a drop-down ceiling system frequently used in office and industrial spaces. By 'flexible' is meant at least capable of supporting a suspended luminaire according to the embodiments of the present invention in a dependable and secure manner without stretching, breaking or bending. Depending on the gap between a ceiling 1470 and the top side of the batwing luminaire assembly, a dust shield 1405 may optionally be included to prevent dust and debris from entering into the confines of the assembly, and also providing for easier cleaning and maintenance of the mounted batwing luminaire assembly during use.

In a second embodiment employing more rigid support means, 1401, the one or plurality of rigid rods 1486 include solid cylinders, rods, and other linear shapes capable of supporting the weight of the batwing luminaire assembly in its desired orientation. In other embodiments, the one or plurality of rigid rods 1486 includes conduit, hollow cylinders, rods, tubes and other hollow linear shapes capable of supporting the weight of the batwing luminaire assembly in its desired orientation, and optionally being capable of internally positioning electrical and control wires within their confines to provide power to the batwing luminaire assembly in a discreet manner without exposed electrical cables or wires showing. In a related embodiment not shown, the rigid mounted configuration 1401 can be inverted with respect to the view shown in FIG. 14, so that the rigid support or suspension means 1486 enable mounting the batwing luminaire assembly to a flat or horizontal surface with the diffusing lens portion oriented in an upward facing orientation, providing for example, but not limited to a lighted rail system along a desk surface in which the batwing luminaire assembly is mounted by means of one or more rigid rods 1486, at some distance above the surface corresponding to the length of the rods. In an additional embodiment, the one or plurality of rigid rods as element 1486 are coupled to the extruded mounting rail 1402 by some securement means 1487. The securement means 1487 may include, but is not limited to, threaded male/female attachment means, snap/press fit or friction attachment, or alternatively more permanent attachment means including bonding, gluing, welding and the like.

Figure 15:
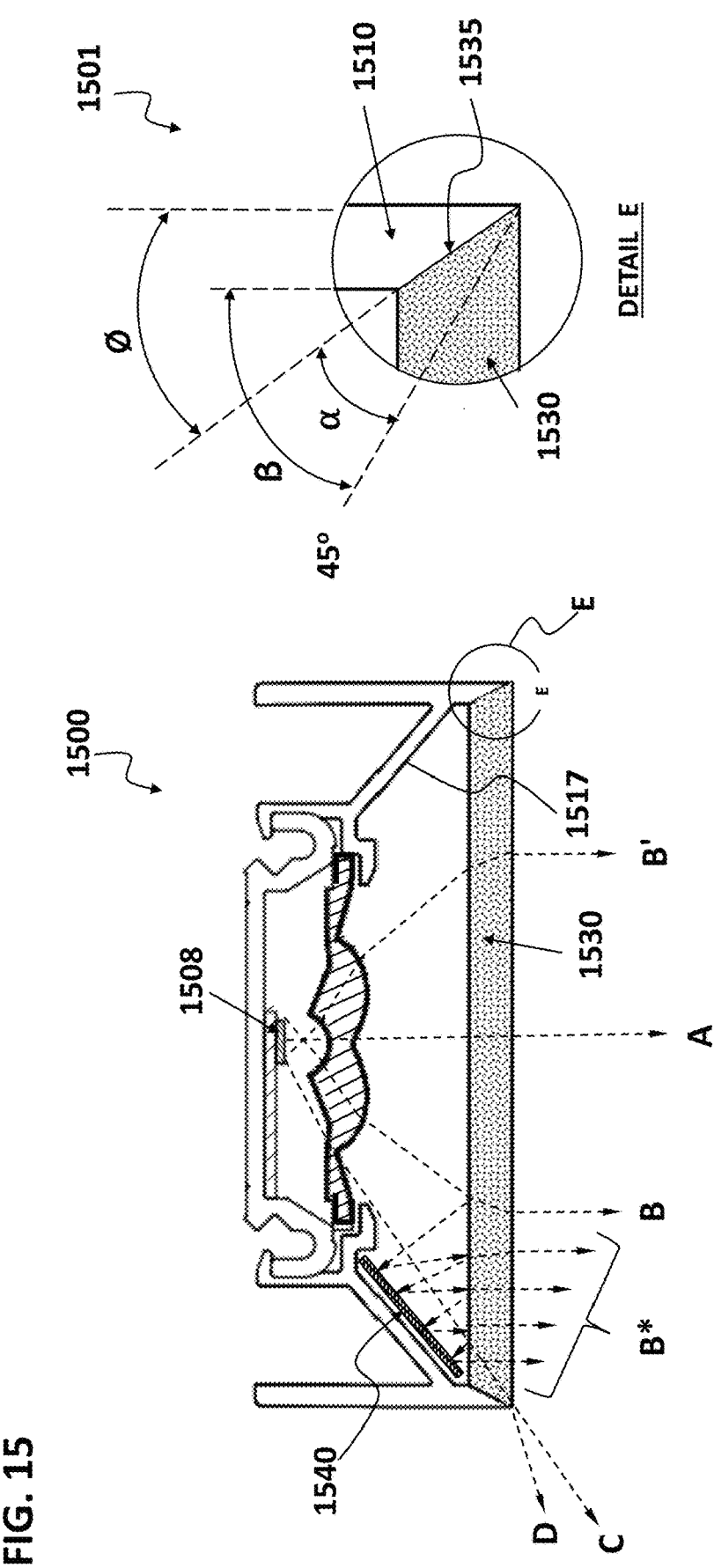
FIG. 15 shows an illustration of light ray-tracing and diffusing lens housing junction detail for a batwing-style catadioptric lens containing luminaire assembly.

FIG. 15 shows an illustration 1500 of light ray-tracing with one embodiment of a batwing luminaire assembly and diffusing lens housing junction detail in a second view 1501. In the first view 1500, the cross-sectional view of the assembly is shown with an LED illumination element 1508 providing the source of emitting rays or light beams indicated by the alphabetically labeled dotted lines representing a plurality of light rays projecting from the LED element through the batwing lens and then onto the upper or inner surface of the diffusing lens element 1530.

Here, view 1500 shows a light-ray tracing cutaway view of batwing luminaire assembly including an LED illumination element 1508, extruded housing side panel 1510 with a inner surface 1517 of the housing support wing portion adjacent to the inner or upper side of the diffusing lens element 1530. In one embodiment, the inner surface 1517 has a light reflecting element 1540 attached to its surface, with a reflective face or free surface of the light reflecting element 1540 being directed inwards so as to receive and re-direct any incident light impinging on its surface. In operation, element 1540 provides greater reflectivity than the plain inner surface 1517 of the housing support wing portion, as discussed below. Normally, ray A represents a ray at a normal angle (being perpendicular to the horizontal surface of the LED illumination element 1508, the normal angle causing ray A to pass directly through the center of the batwing lens element and through the diffusing lens element at a normal angle as shown by the dotted line A. At angles less than normal, light emitted by the LED element and subsequently emitted by passing through the batwing lens element will impinge the upper surface of the diffusing lens element 1530 at a relative angle of less than 90° (degrees), resulting in some of the light being injected into element 1530 and then transmitted through element 1530 and then into the surroundings, in addition to some portion of the impinging light, depending on the angle of incidence, being internally reflected from the inner surface of element 1530, back into the interior space of the batwing luminaire housing, as illustrated by ray tracing B, which has a primary refractive portion illustrated by ray B' on the right side, and a series of successive internally reflected rays denoted by ray tracings B*, which show the internally reflected light rays from B being successively reflected and redirected by reflection between the inner surface of element 1530 and the outer surface of light reflecting element 1540, which then functions to capture and redirect internally reflected light rays more effectively than a plain surface 1517, and thus acting to increase the overall intensity or luminosity of light emitted from the batwing luminaire assembly 1500. In the main illustration, light ray C represents a maximum emitted light ray traceable to one extreme end of the LED illumination element, such that the normal angle of projected light, relative to the center axis or light ray A is equivalent to 2*C in angular terms, wherein the angle 2*C is typically between 110° to about 160°, or alternatively between 120° to about 150°, or alternatively between 130° to about 140°.

In embodiments of the instant invention wherein the light reflecting element 1540 is present, this element acts to increase the ultimate angle of emission, denoted by ray D, of the batwing luminaire assembly owing to the additional amount of light directed towards the edge by means of increased internal reflection provided by element 1540 and its position adjacent to the diffusing lens element 1530. In this and related embodiments featuring the optional light reflecting element 1540, the light ray D represents a maximum emitted light ray traceable the LED illumination element, such that the normal angle of projected light, relative to the center axis or light ray A is equivalent to 2*D in angular terms, wherein the angle D is greater than angle C, and wherein the angle 2*D is typically between 100° to about 170°, or alternatively between 110° to about 160°, or alternatively between 120° to about 150°, or alternatively around 130° to about 140°. In addition to increasing the effective angle of illumination from angle C to D, as denoted by rays C and D as shown, it is believed that the light reflecting element 1540 also serves to create a more uniform field of illumination towards the edges of the batwing luminaire assembly, resulting in a more uniform overall lighting effect.

As shown in FIG. 15, detail E (circular E section of right side illustration 1501) shows a range of acceptable angles that may be formed between the right and left sides of the extruded housing side panel, 1510 and the corresponding right and left sides of the diffusing lens element 1530, by adjusting the combined slopes of the diffusing lens housing junction 1535 angle between a minimum and a maximum angle, to the desired angle being denoted by $\emptyset$ (phi). The angle $\emptyset$ can vary between an angle $\alpha$ (alpha) of about 20° to an angle (beta) of 45°, or if defined as the corresponding compound angle of 90–$\emptyset$, then $\emptyset$ can vary between an angle of 20° to 70° with respect to the normal outside surface of the housing side panel. In embodiments in which the angle $\emptyset$ is greater than about 20°, this results in increased luminosity in the region of the diffusing lens housing junction 1535 for the reasons disclosed hereinabove with respect to the nature of the internally reflected and redirected light rays emanating from the LED illumination element. In preferred embodiments, the angle $\emptyset$ is an angle selected, depending on the relative thicknesses of the housing side panel 1510 and diffusing lens element 1530, so that the diffusing lens housing junction 1535 is sloped to enable the greatest amount of transmitted light through the portion of the diffusing lens element located near the diffusing lens housing junction.

Process & Materials of Luminaire Components

The various elements of the embodiments of the present invention disclosed herein may be constructed using any suitable materials commonly employed in the fabrication of luminaires, as discussed hereinabove for the optical components including the catadioptric lens and diffusing lens elements in the various inventive embodiments disclosed. For other components of the luminaire, for example, the mounting rail and housing side panels may be constructed from materials including plastic, polymer, metals, metal alloys, composites and combinations thereof. Because of the linear nature of the batwing-style catadioptric lens and other luminaire components, they are preferably formed by extrusion molding, which serves to produce extremely regular and uniformly dimensioned products with production tolerances suitable for use in the assembled luminaire assemblies disclosed herein.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

APPENDIX

| FIGURE KEY | |
|---|---|
| FIG. 1 | FIG. 6 |
| 100 Lens Assembly | 600 Lens assembly |
| 101 Upper lens section | 603 Upper lens lobe (right and left) |
| 102 Lens center transition plane | 610 Lower lens lobe |
| 103 Upper lens lobe | 612 Lower linear transition region |
| 104 Upper lobe transition plane | 620 Coextruded top layer |
| 105 Upper linear transition region | 625 Extruded main lens region |
| 106 Edge support region | 630 Coextruded bottom layer |
| 108 Outer edge | 660 Left lens lobe inscribed ellipse |
| 109 Lower lens section | 662 Right lens lobe inscribed ellipse |
| 110 Lower lens lobe | |
| 111 Lower lobe transition plane | 670 Lower lobe inscribed circle |
| 112 Lower linear transition region | 680 Projection plane P |
| 114 Lower Lens surface | R1 Lower lobe radius |
| 120 Coextruded top layer | R2 Long elliptical radius |
| 125 Extruded main lens region | R3 Short elliptical radius |
| 130 Coextruded bottom layer | A Normal axis (perpendicular) |
| A Optical vertical axis | C Planar axis (horizontal) |
| B Optical longitudinal axis | P Projection plane |
| C Lens horizontal axis | |

| FIG. 2 | FIG. 7 |
|---|---|
| 200A Lens Assembly with lower coextruded layer | 700 Lens assembly |
| | 725 Extruded main lens region |
| 200B Lens Assembly with upper coextruded layer | A Normal axis |
| | W Width of lens |
| 201 Upper lens section | H Maximum height or thickness |
| 202 Lens center transition plane | S Upper lobe region width |
| 203 Upper lens lobes (right St left) | R1 Lower lobe radius |
| 204 Upper lobe transition plane | V Lower lens tang width |
| 205 Upper linear transition region | E1 Edge thickness |
| 206 Edge support region | E2 Edge tang thickness |
| 208 Outer edge | |
| 209 Lower lens section | |
| 210 Lower lens lobe | |
| 211 Lower lobe transition plane | |
| 212 Lower linear transition region | |
| 214 Lower Lens surface | |
| 220 Coextruded top layer | |
| 225 Extruded main lens region | |
| 230 Coextruded bottom layer | |

| FIG. 3 | FIG. 8 |
|---|---|
| 300A Lens Assembly with dual coextruded layer | 800 Lens assembly |
| | 820 Upper coextruded layer |
| 300B Lens Assembly with dual coextruded layer | 825 Extruded main lens region |
| | 830 Lower coextruded layer |
| 301 Upper lens section | 825 Extruded main lens region |
| 302 Lens center transition plane | A Normal axis |
| 303 Upper lens lobe | W Width of lens |
| 304 Upper lobe transition plane | H Maximum height or thickness |
| 305 Upper linear transition region | S Upper lobe region width |
| 306 Edge support region | R1 Lower lobe radius |
| 308 Outer edge | R2 Upper lobe major radius |
| 309 Lower lens section | R3 Upper lobe minor radius |
| 310 Lower lens lobe | E1 Edge thickness |
| 311 Lower lobe transition plane | E2 Edge tang thickness |
| 312 Lower linear transition region | E3 Upper tang width |
| 314 Lower Lens surface | |
| 320 Coextruded top layer | |
| 325 Extruded main lens region | |
| 330 Coextruded bottom layer | |

| FIG. 4 | FIG. 9 |
|---|---|
| 400 Lens assembly | 900 Polar radiance plots |
| A Normal axis | 901 Scale key (degrees) |
| B Longitudinal axis | 950 Outer radiance envelop |
| C Planar (horizontal) axis | 952 Center radiance envelop |
| A/B Normal/Perpendicular plane | 954 Outer radiance envelop |
| B/C Horizontal/Longitudinal plane | 956 Center radiance envelop |
| 960 Normal lens orientation | |
| 970 Skewed lens orientation | |
| A Normal axis | |
| C Horizontal projection plane | |

| FIG. 5 | FIG. 10 |
|---|---|
| 500 Lens assembly | 1000 Radiance Plots |
| 550 Lens assembly | 1002 Center radiance envelop |
| A Side view | A Clear lens |
| H Height or maximum thickness | B Single frosted layer |
| W Width of lens | C Dual frosted layers |
| B Top view | |

| FIG. 11 | FIG. 12 |
|---|---|
| 1100 Batwing luminaire assembly | 1200 Batwing luminaire assembly (exploded view) |
| 1102 Luminaire channel assembly | |
| 1104 Extruded mounting rail | 1202 Luminaire channel assembly |
| 1106 Power coupling element | 1204 Extruded mounting rail |
| 1108 LED illumination element | 1220 Batwing lens element |
| 1110 Extruded housing side panel(s) | 1230 Diffusing lens element |
| | 1240 Light reflecting element(s) |
| 1112 Mounting rail side tang(s) | 1250 Extruded housing side panel(s) |
| 1113 Lens upper engagement region(s) | |
| | 1260 Luminaire end cap |
| 1114 Mounting rail attachment tang(s) | 1262 End cap engagement element |
| | A Detail A |
| 1115 Lens lower engagement region(s) | B Detail B |
| 1116 Housing lower lens engagement tang(s) | |
| 1117 Inner side of 1119 | |
| 1119 Housing support wing | |
| 1120 Batwing lens element | |
| 1130 Diffusing lens element | |
| 1131 Outer surface of 1130 | |
| 1133 Inner surface of 1130 | |
| 1135 Diffusing lens housing junction(s) | |
| 1140 Light reflecting element | |
| 1150 Outer surface of housing side panel(s) | |

| FIG. 13 | FIG. 14 |
|---|---|
| 1301 End cap of batwing luminaire (partial cutaway) | 1400 Ceiling suspension configuration |
| | 1401 Ceiling mount configuration (end portion view) |
| 1303 Batwing luminaire in parallel configuration | |
| | 1402 Extruded mounting rail |
| 1304 Extruded mounting rail | 1404 Ceiling mount with rod(s) |
| 1305 Batwing luminaire in vertical configuration | 1405 Upper dust shield |
| | 1450 Housing side panel |
| 1307 Cutaway view of interior of luminaire | 1460 End cap of batwing luminaire |

-continued

FIGURE KEY

1380 Ceiling portion
1381 Horizontal mounting or suspension means
1390 Wall portion
1391 Vertical mounting means
1461 End cap of batwing luminaire (partial cutaway)
1470 Ceiling plane (dotted line grid)
1485 Suspension cable(s)
1486 Suspension or mounting rod
1487 Suspension coupling means

FIG. 15

1500 Light-ray tracing cutaway view of batwing luminaire assembly
1501 Detail E expanded view
1508 LED illumination element
1510 Extruded housing side panel (portion)
1517 Inner surface of housing support wing
1530 Diffusing lens element
1535 Diffusing lens housing junction
1540 Light reflecting element
E Circular Detail E
a Angle alpha
g Angle beta
0 Angle phi
A Normal angle ray (from LED)
B Primary refraction ray
B' Internal refraction ray
B* Plurality of reflected rays from 1540
C Nominal angle ray
D Extreme angle ray

The invention claimed is:

1. A luminaire, comprising:
   (a) at least one light source;
   (b) a mounting rail;
   wherein said mounting rail features right and left housing engagement tangs;
   wherein said right housing engagement tang features a right lower catadioptric lens retention surface and wherein said left housing engagement tang features a left lower catadioptric lens retention surface;
   (c) a housing assembly comprising a right housing side panel, a left housing side panel and a lower diffusing lens element;
   wherein each of said right and left housing side panels are immediately adjacent to said lower diffusing lens element and connect to said lower diffusing lens element at a right diffusing lens junction and at a left diffusing lens housing junction;
   wherein said right and left housing side panels each feature a housing support wing;
   wherein each of said housing support wings bear a mounting rail attachment tang and a lower lends engagement tang;
   wherein said right and left housing side panels each feature an upper mounting rail engagement tang that engages with one of said right and left housing engagement tangs located on said mounting rail element;
   wherein said right and left housing side panels each feature a lower lens attachment tang that engages with a right and left lower lens engagement region to secure a right and left side of a catadioptric lens element in place between each of a right and left side upper mounting rail tangs each having an upper lens engagement region, and said right and left lower engagement tangs;
   (d) a catadioptric lens; wherein said catadioptric lens has right and left edge support regions; wherein each of said right and left edge support regions feature a lower and upper engagement surface; and
   (e) a left and right luminaire end cap located adjacent to the left and right sides of said housing assembly; and
   (e) a power supply means capable of energizing said light source.

2. The luminaire of claim 1, wherein each of said housing support wings further comprises a light reflecting element located on a bottom facing surface of said housing support wing and extending from said diffusing lens housing junction to said housing lower lens engagement tang.

3. The luminaire of claim 2, wherein said light source is selected from a point source, a linear source, and a linear array of point sources.

4. The luminaire of claim 3, wherein said linear light source is selected from an incandescent lamp, fluorescent tube, linear LED, linear LED array, linear Lambertian emitter, and linear fiber optic light guide.

5. The luminaire of claim 4, wherein said point source is selected from a solid state LED, Lambertian emitter, and 2π emitter.

6. The luminaire of claim 1, wherein said right and left housing side panels are opaque; and wherein said diffusing lens element is at least partially light transmitting.

7. The luminaire of claim 1, wherein said left and right luminaire end caps each feature a first and second end cap engagement element that reversibly secures each end cap to at least one end of said housing assembly.

8. The luminaire of claim 1, wherein said power supply means is a power coupling element connecting said at least one light source to a power source selected from a battery, control circuit, printed circuit control board, alternating current source, capacitor, and combinations thereof.

9. The luminaire of claim 1, wherein said catadioptric lens has an upper lens section, an intermediate main lens region and a lower lens section disposed opposite the upper lens section; wherein the light from said light source is directed onto said upper lens section and is subsequently emitted from said lower lens section; wherein the upper lens section comprises a first and second bilaterally symmetric upper lens lobe each with surfaces exhibiting positive curvatures situated about a center optical axis A that is normal and perpendicular with respect to a cross-sectional plane through the upper lens section; wherein said lower lens section features a single symmetric lower lens lobe with a surface exhibiting negative curvature situated about said center optical axis A; wherein said first and second upper lens lobes are joined at the center optical axis A and are contiguous with and adjacent to right and left upper lobe transition regions, respectively; wherein said right and left upper lobe transitions regions are each contiguous with and adjacent to right and left edge support regions, respectively;
   wherein said lower lens lobe is contiguous and adjacent to right and left lower linear transition regions; and
   wherein said right and left lower transitions regions are contiguous and adjacent to said right and left edge support regions, respectively.

10. The luminaire of claim 9, wherein at least a portion of either said upper or lower surfaces of said upper and lower lens sections of said catadioptric lens is composed of materials having different optical properties from said main lens region.

11. The luminaire of claim 9, wherein said upper lens section comprises an upper coextruded top layer adjacent to and contiguous with said upper lens section and extending from a first left edge support region to a second right edge support region.

12. The luminaire of claim 9, wherein said lower lens section comprises a lower coextruded bottom layer adjacent to and contiguous with said lower lens section and extending from a first left edge support region to a second right edge support region.

13. The luminaire of claim 9, wherein said upper lens section comprises an upper coextruded top layer adjacent to and contiguous with said upper lens section and extending from a first left edge support region to a second right edge support region; and
    wherein said lower lens section comprises a lower coextruded bottom layer adjacent to and contiguous with said lower lens section and extending from a first left edge support region to a second right edge support region.

14. The luminaire of claim 9, wherein said portion of either of said upper or lower surfaces of said upper and lower lens sections comprises a contiguous film of uniform thickness of a material having different optical properties from said main lens region.

15. The luminaire of claim 9, wherein said upper lens lobes have upper surfaces exhibiting a surface curvature corresponding to a segment selected from a circle, ellipse and parabola; and wherein said lower lens lobe has a lower surface exhibiting a surface curvature corresponding to a segment of a circle.

16. The luminaire of claim 15, wherein said upper lens lobes with upper surfaces exhibiting a convex surface curvature corresponding to a segment of a circle have centers of origin C2 and C3 located on a horizontal plane parallel to a plane bisecting said upper and lower lens sections, and have a radius of R2.

17. The luminaire of claim 15, wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3.

18. The luminaire of claim 15, wherein said upper lens lobes with upper surfaces exhibiting a convex surface curvature corresponding to a segment of a parabola have centers of origin C2 and C3 located on a horizontal plane parallel to a plane bisecting said upper and lower lens sections, and have a radius of R2 and a parabolic constant of n.

19. The luminaire of claim 15, wherein said lower lens lobe with a lower surface exhibiting a concave surface curvature corresponding to a segment of a circle has a center of origin C1 located on a normal perpendicular axis A, and having a radius of R1.

20. The luminaire of claim 15, wherein said upper lens lobes with upper surfaces exhibiting a convex surface curvature corresponding to a segment of an ellipse have centers of origin C2 and C3 located on a horizontal plane parallel to a plane bisecting said upper and lower lens sections, and have a major radius of R2 and a minor radius of R3; and
    wherein said lower lens lobe with a lower surface exhibiting a concave surface curvature corresponding to a segment of a circle has a center of origin C1 located on a perpendicular optical axis A, and having a radius of R1.

21. The luminaire of claim 15, wherein said second and third centers of origin C2 and C3 are located on a horizontal plane bisecting said upper lens section and said lower lens section; with a first center of origin located on said perpendicular optical axis A;
    wherein said first, second and third centers of origin C1, C2 and C3 are positioned in a triangular relationship; wherein C1, C2 and C3 are located on the vertices of a hypothetical equilateral triangle wherein C1 is located on said perpendicular optical axis A; wherein C1 is located below said horizontal plane; and
    wherein C2 and C3 are located on a horizontal plane parallel to a plane bisecting said upper and lower lens sections.

* * * * *